(12) United States Patent
Holness et al.

(10) Patent No.: US 8,149,692 B2
(45) Date of Patent: Apr. 3, 2012

(54) RING TOPOLOGY DISCOVERY MECHANISM

(75) Inventors: Marc Holness, Nepean (CA); Bashar Abdullah, Ottawa (CA); Marc Andre Rochon, Gatineau (CA)

(73) Assignee: Ciena Corporation, Linthicum, MD (US)

( * ) Notice: Subject to any disclaimer, the term of this patent is extended or adjusted under 35 U.S.C. 154(b) by 338 days.

(21) Appl. No.: 12/347,362

(22) Filed: Dec. 31, 2008

(65) Prior Publication Data

US 2010/0165883 A1 Jul. 1, 2010

(51) Int. Cl.
*H04J 3/14* (2006.01)
*G01R 31/08* (2006.01)
*H04L 12/28* (2006.01)
(52) U.S. Cl. ........................ 370/222; 370/258
(58) Field of Classification Search .................. None
See application file for complete search history.

(56) References Cited

U.S. PATENT DOCUMENTS

| | | | |
|---|---|---|---|
| 6,766,482 | B1 | 7/2004 | Yip et al. |
| 7,664,052 | B2 * | 2/2010 | Oku et al. ............... 370/254 |
| 2004/0114530 | A1 * | 6/2004 | Cornet et al. ............ 370/252 |
| 2007/0025241 | A1 * | 2/2007 | Nadeau et al. ........... 370/229 |
| 2007/0140126 | A1 * | 6/2007 | Osswald et al. .......... 370/236.2 |
| 2007/0230368 | A1 * | 10/2007 | Shi et al. ................. 370/254 |
| 2008/0159137 | A1 | 7/2008 | Konuma et al. |

OTHER PUBLICATIONS

Jeong-dong Ryoo et al.: "Ethernet Ring Protection for Carrier Ethernet Networks" Communications Magazine, IEEE, Sep. 12, 2008, vol. 46, Issue 9, pp. 136-143, ISSN 0163-6804.
June-Koo Kevin Rhee et al.: "Ethernet Ring Protection Using Filtering Database Flip Scheme for Minimum Capacity Requirement", Electronics and Telecommunications Research Institute Journal, Dec. 2008, vol. 30, No. 6, pp. 874-876, ISSN 1225-6463.
International Search Report and Written Opinion dated Feb. 12, 2010 for International Application No. PCT/CA2009/001570, International Filing Date Nov. 2, 2009 (12 pages).

* cited by examiner

*Primary Examiner* — Marcus R Smith
(74) *Attorney, Agent, or Firm* — Christopher & Weisberg, P.A.

(57) ABSTRACT

A method automatically discovers a topology of a communication network ring. The ring includes a plurality of nodes. Each node includes a first port and a second port. A ring topology request or a response to the ring topology request is received from at least one node on the ring. The ring topology request or the response to the ring topology request includes an identification of the at least one node and an indication of a hop count needed to reach the at least one node. The ring topology request or the response to the ring topology request is forwarded to at least one neighboring node on the ring through the first port. The topology is determined based on the identification of the at least one node, the hop count, and an identification of the first port.

20 Claims, 21 Drawing Sheets

| Byte Offset | ETD TLV Field |
|---|---|
| 0 | Type |
| 1 | Length |
| 3 | Node Count |
| 4 .. 4+$m$-1 | Signature 1 |
| 4+$m$ .. 4+2$m$-1 | Signature 2 |
| : | : |
| 4+($n$-1)$m$ .. 4+($n$)$m$-1 | Signature $n$ |

$m$ = size of individual signature in TLV $n$ = number of nodes on the ring

RING TOPOLOGY DISCOVERY MECHANISM

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to communication networks, and more specifically to a method and system for ring topology discovery in a communication network.

BACKGROUND OF THE INVENTION

Ethernet-Shared Protection Ring ("E-SPRing"), as standardized according to International Telecommunication Union ("ITU") specification ITU-T G.8032, defines an effort to provide sub-50 ms protection for Ethernet traffic in a ring topology while simultaneously ensuring that no loops are formed at the Ethernet layer. Using the E-SPRing standard, there is a central node called the Ring Protection Link ("RPL") owner node which blocks one of the ports, known as the RPL port, to ensure that no loop forms for the Ethernet traffic. Ring Automated Protection Switching ("R-APS") messages are used to coordinate the activities of switching the RPL link on or off.

Any failure along the ring triggers an R-APS Signal Fail message, also known as a Failure Indication Message ("FIM"), along both directions from the nodes adjacent to the failed link after these nodes have blocked the port facing the failed link. On obtaining this message, the RPL owner node unblocks the RPL port. Because at least one link has failed somewhere in the ring, that there can be no loop formation in the ring. During the recovery phase, when the failed link gets restored, the nodes adjacent to the restored link send RAPS No Request messages, also known as a Recovery Indication Messages ("RIM"). Upon obtaining a RIM message, the RPL owner blocks the RPL port and sends an R-APS OK message, which causes all other nodes, other than the RPL owner node in the ring to unblock all blocked ports.

The E-SPRing protocol is robust enough to work for unidirectional failure and in case of multiple failures in the ring. However, there is currently no mechanism provided by the E-SPRing protocol, i.e., ITU-T G.8032, to determine the actual Ring Topology, i.e., the nodes and links that form the ring.

Ring topology is required to perform ring topology validation. In other words, when a service provider provisions and/or configures a ring, a tool is needed to validate that the actual configuration is what was expected. In addition, if/when a ring failure occurs, the service provider or repair technician has no convenient means to determine exactly where the fault occurs.

Additionally, when a fault or topology change occurs, each node temporarily clears or "flushes" its current Forwarding Database ("FDB"), a table which contains the routing configuration from the point of view of the current node. If data arrives at a node for forwarding during the time interval between the FDB flushing and establishing a new FDB, the node does not know exactly how to forward the data. In this case, the node simply "floods" the ring by forwarding the data through each port resulting in poorer ring bandwidth utilization during a ring protection and recovery event.

Therefore, what is needed is a method and system for discovering the topology composition of Ethernet rings and to update data forwarding tables upon Protection and Recover switching without flooding the network.

SUMMARY OF THE INVENTION

The present invention advantageously provides a method, apparatus and system for automatically discovering the topology of a communication network ring. Additionally, the automatic topology mechanism may further be used to reconfigure the forward database tables upon notification of a failed or recovered link without flooding the communication network ring.

In accordance with one aspect of the present invention, a method is provided for automatically discovering the topology of a communication network ring. The ring includes a plurality of nodes. Each node includes a first port and a second port. A ring topology request or a response to the ring topology request is received from at least one node on the ring. The ring topology request or the response to the ring topology request includes an identification of the at least one node and an indication of a hop count needed to reach the at least one node. The ring topology request or the response to the ring topology request is forwarded to at least one neighboring node on the ring through the first port. The topology is determined based on the identification of the at least one node, the hop count, and an identification of the first port.

In accordance with another aspect of the present invention, a node for automatically discovering a topology of a communication network ring includes a first port, a second port and a processor. The ring includes a plurality of nodes. Each of the first port and the second port are operable to receive and transmit data. At least one port receives a ring topology request or a response to the ring topology request from at least one other node on the ring. The ring topology request or the response to the ring topology request includes an identification of the at least one other node and an indication of a hop count needed to reach the at least one other node. The port other than the port on which the ring topology request or response was received forwards the ring topology request or the response to the ring topology request to at least one neighboring node on the ring. The processor is electrically connected to each port. The processor determines the topology based on the identification of the at least one node, the hop count, and an identification of the forwarding port.

In accordance with yet another aspect of the present invention, a system for automatically discovering a topology of a communication network ring includes a plurality of nodes interconnected in a ring configuration. Each node includes a first port, a second port and a processor. Each port is operable to receive and transmit data. At least one of the first port and the second port receives a ring topology request or a response to the ring topology request from at least one other node on the ring. The ring topology request or the response to the ring topology request includes an identification of the at least one other node and an indication of a hop count needed to reach the at least one other node. The port of the first port and the second port other than the port on which the ring topology request or the response was received forwards the ring topology request or the response to the ring topology request to at least one neighboring node on the ring. The processor is electrically connected to each port. The processor determines the topology based on the identification of the at least one node, the hop count, and an identification of the forwarding port.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
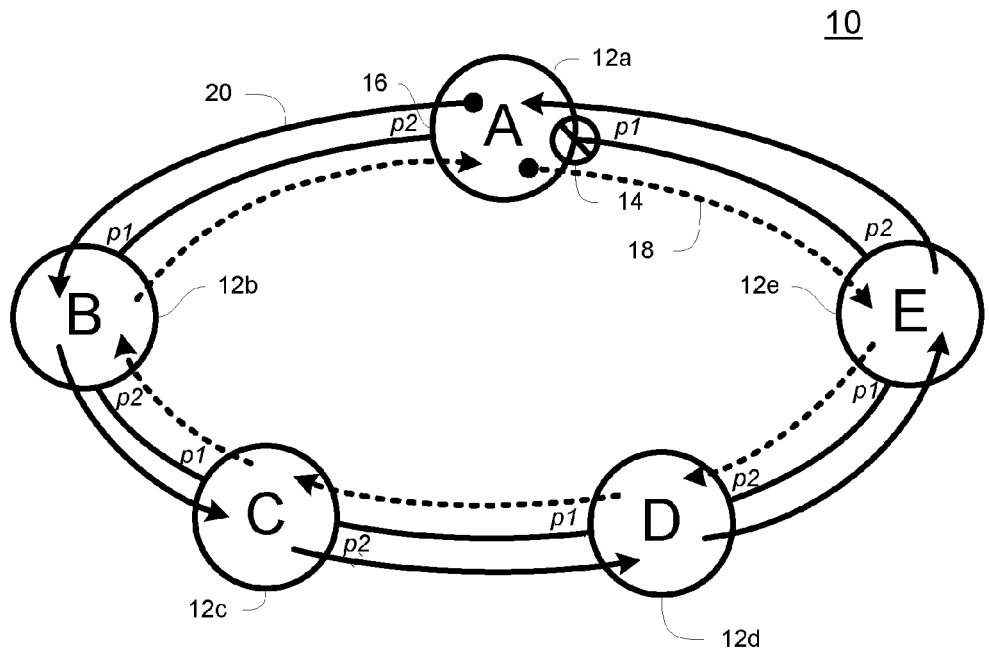
FIG. 1 is a block diagram of an exemplary Ethernet ring utilizing a ring discovery mechanism constructed in accordance with the principles of the present invention.

Before describing in detail exemplary embodiments that are in accordance with the present invention, it is noted that the embodiments reside primarily in combinations of apparatus components and processing steps related to implementing a system and method for automatically discovering ring topology in an Ethernet-Shared Protection Ring and using the topology to prevent forward database flushing. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments of the present invention provide different mechanisms that may be used in coordination with the E-SPRing protocol defined by ITU-T G.8032 to determine the ring topology. Ring topology is used for general operations, administration and maintenance ("OAM") functions such as, but not limited to ring topology confirmation and ring topology fault discovery.

One embodiment of the present invention extends ITU-T G.8032 Ethernet Ring Automated Protection Switching ("R-APS") messages over the ring to optionally piggyback topology information. This mechanism specifies how each ring node embeds unique ring node signature information in various R-APS messages. The R-APS messages provide a cumulative view of ring node signatures, allowing each ring node to determine the overall ring topology.

Another embodiment of the present invention utilizes per hop IEEE 802.1 ag or ITU-T Y.1731 continuity check protocol messages over the ring. This mechanism introduces a G.8032 R-APS message, which is a type of continuity check message ("CCM") that circulates the ring. At each hop, a ring node inserts a ring node signature in the R-APS CCM being circulated around the ring.

Yet another embodiment of the present invention utilizes the IEEE 802.1ag or ITU Y.1731 Linktrace protocol over the ring. This mechanism extends and leverages the 802.1ag Y.1731 LinkTrace protocol by using the time-to-live parameters returned in Link Trace Reply ("LTR") messages to determine the relative position of each node in the ring, i.e., number of hops away from a requesting node.

Using the ring topology discovery mechanisms, an embodiment of the present invention prevents the need to flush the ring node Forwarding Databases ("FDBs") during a protection and recovery switch. When the ring is supported over an encapsulated network, as defined by IEEE specification 802.1ah, also known as "MAC in MAC," ring nodal extensions may be applied such that no flushing of the FDB is required, thereby significantly improving the overall bandwidth utilization of the ring.

Referring now to the drawing figures in which like reference designators refer to like elements, there is shown in FIG. 1 an exemplary communication network 10 arranged in an E-SPRing configuration which advantageously employs automatic ring topology discovery in accordance with the principles of the present invention. Exemplary communication network 10 is hereinafter referenced as "E-SPRing ring" 10. E-SPRing ring 10 includes an array of nodes 12a, 12b, 12c, 12d, and 12e (referred to collectively as nodes 12) arranged in a ring configuration. Each node 12 includes two forwarding ports designated as p1 14 and p2 16, respectively. In a ring configuration, each node 12 is connected to only two other nodes 12 with port p1 of any node 12 connected to port p2 of its neighboring node 12. Ports p1 14 and p2 16 may also be known as an "East" port and a "West" port, respectively. In network 10, node 12a is the Ring Protection Link ("RPL") owner node as its port p1 14 is the RPL port.

The nodes 12 may include wireless access points, hubs, routers, switches, gateways or any other device commonly known to forward data packets in a communication network. Each node 12 may also be connected to one or more client devices (not shown) and routes data packets between client devices along the ring using commonly used communication protocols such as Transmission Control Protocol/Internet Protocol ("TCP/IP"), Ethernet, etc. Of note, although several of the figures show four, five or six nodes 12, it is understood that the amount of nodes 12 shown are solely to aid explanation. A network 10, constructed in accordance with the principles of the present invention, may have any number of nodes 12, as long as the nodes are interconnected in a ring configuration.

In FIG. 1, the E-SPRing ring 10 is shown operating in a "Normal State" as specified in ITU-T G.8032. In this mode, the RPL owner node 12a initiates transmission of an R-APS "OK" message from each of its ports 14, 16. The R-APS "OK" message is forwarded through the ring in a clockwise direction from port p1 14 along path 18. Eventually, the R-APS "OK" message is received back at the RPL owner node 12a at port p2 16. Likewise, another R-APS "OK" message is forwarded through the ring in a counter-clockwise direction from port p2 16 along path 20 and is eventually received back at the RPL owner node 12a at port p1 14.

Figure 2:
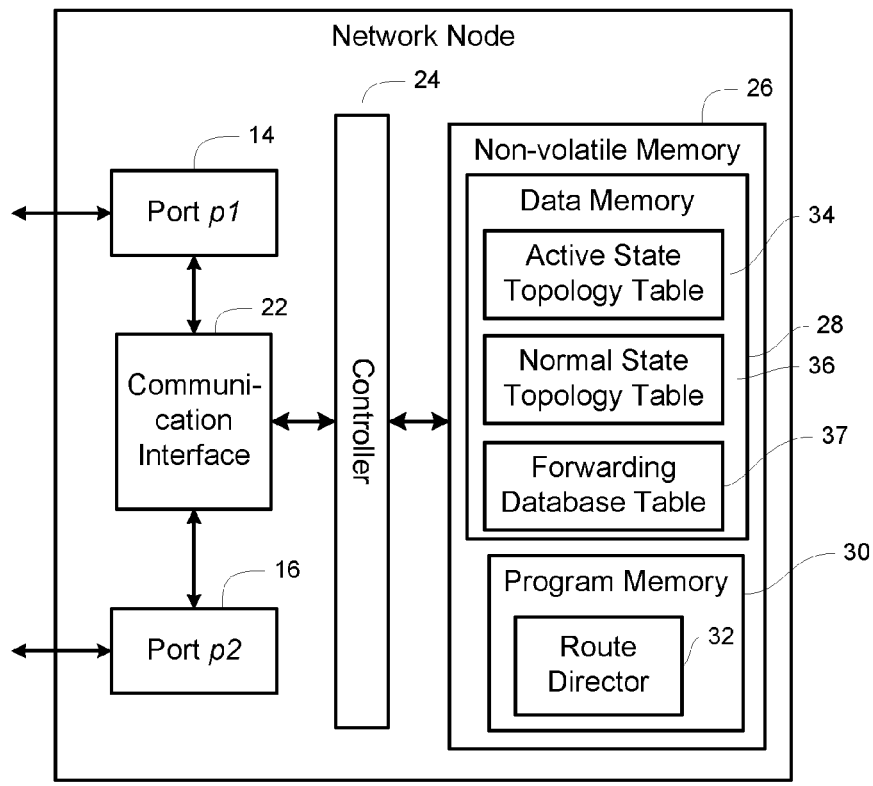
FIG. 2 is a block diagram of an exemplary E-SPRing node constructed in accordance with the principles of the present invention.

Referring now to FIG. 2, an exemplary node 12 includes a communication interface 22 communicatively coupled to a controller 24. The communication interface 22 may be wired, wireless, or any combination thereof The communication interface 22 interacts with two ports, p1 14 and p2 16, to transfer data packets between the network nodes 12 and client devices (not shown) using known communication protocols, e.g., Ethernet, Wi-Fi, etc. The controller 24 controls the processing of information and the operation of the network node 12 in a well-known manner. The controller 24 is also coupled to a non-volatile memory 26.

The non-volatile memory 26 includes a data memory 28 and a program memory 30. Examples of non-volatile memory include, but are not limited to, a hard drive, a memory stick, an Electrically Erasable Programmable Read-Only Memory ("EEPROM"), a flash memory, etc. Additionally, instead of or in addition to non-volatile memory, the data memory 28 may be included as some form of volatile memory, e.g., RAM. The program memory 30 contains a route director 32 which determines the routing topology of the E-SPRing ring 10 and maintains two state topology tables: an active state topology table 34 and a normal state topology table 36. The operation of the route director 32 is discussed in more detail below. The data memory 28 stores data files such as the active state topology table 34, the normal state topology table 36, forwarding database ("FDB") tables 37 and various other user data files (not shown).

The normal state topology table 36 contains the topology of the E-SPRing ring 10 when there are no faults on the ring 10. This table 36 coincides with the "Normal State" specified in ITU-T G.8032. The normal state topology table 36 is only updated when an "OK" message is received on both ports, p1 14 and p2 16. Otherwise, the values in the table 36 are persistent.

The active state topology table 34 contains the topology change in the E-SPRing ring 10 when at least one or more faults have occurred or are in recovery. These conditions coincide with the "Protect State" and "Pending State" specified in ITU-T G.8032. The purpose of the active state topology table 34 is to facilitate advanced topology reporting, and to reduce potential processing in maintaining topology information. In the absence of faults, the active state topology table 34 is ignored.

The FDB tables 37 instruct each node 12 as to which port 14, 16 to use to forward data to other nodes in the ring 10. The FDB tables 37 are not to be confused with the topology tables 34, 36.

Figures 3, 4:
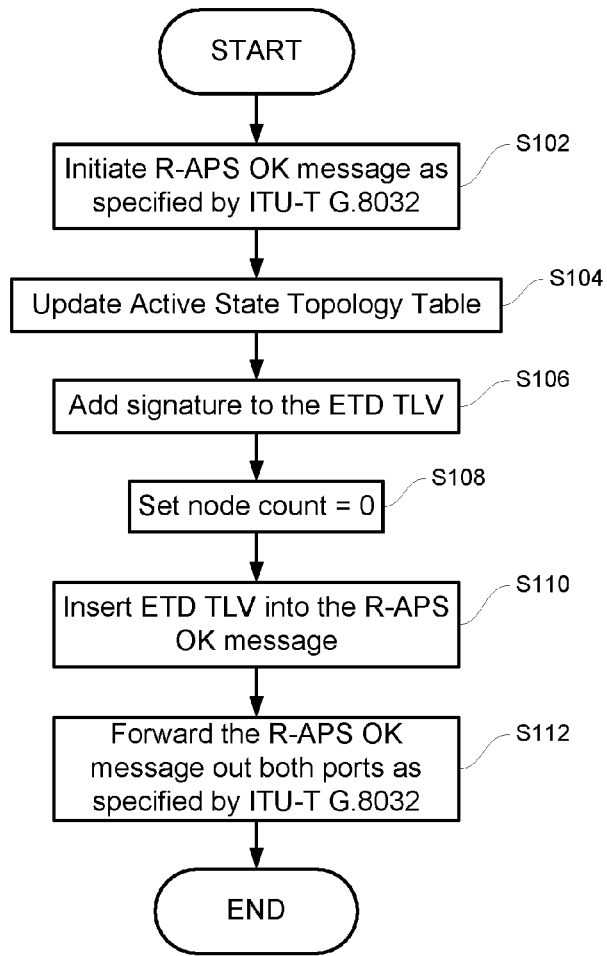
FIG. 3 is a flowchart of an exemplary Ethernet ring auto discovery process performed by an RPL owner node during a NORMAL state according to the principles of the present invention.
FIG. 4 is an exemplary Ethernet Ring Topology Discovery ("ETD") Type-Length Value ("TLV") field constructed in accordance with the principles of the present invention.

Referring now to FIG. 3, an exemplary operational flowchart is provided that describes steps performed by a route director 32 of an RPL owner node 12a for automatically discovering the ring topology when the ring 10 is operating in a Normal State. The route director 32 introduces an Ethernet Ring Topology Discovery ("ETD") type-length-value ("TLV") element to carry Ethernet Ring node information and a node count. The route director 32 of the RPL owner node 12a initiates an R-APS "OK" message, such as one specified by the guidelines according to ITU-T G.8032 (step S102). The route director 32 updates the active state topology table 34 (step S104) and adds node information, also referred to as a signature, to the ETD TLV (step S106). The signature is a set of one or more attributes that uniquely identifies a node on the Ethernet Ring ring 10.

An exemplary Ethernet Ring Topology Discovery TLV 38, constructed in accordance with the principles of the present invention, is provided in FIG. 4. The new ETD TLV 38 is composed of a Type field 40 (1 octet), Length field 42 (2 octets), an optional Node count 44 (1 octet) and one or more Signature fields 46 (m octets). The Length field 42 indicates the size of the TLV 38 in octets, not including the Type 40 and Length fields 42. The Node count 44, if specified, indicates the number of Signature fields 46 in the TLV 38. The Signature field 46 should contain, at a minimum, a Ring unique node identifier, such as a nodal MAC address, or node identifier. The Signature field 46 may optionally contain additional nodal information, such as one or more of the following (but not limited to): a text label, nodal state, port(s) state, RPL owner, fault condition, configuration information.

Returning to FIG. 3, the route director 32 of the RPL owner node 12a sets the node count equal to zero (step S108), inserts the new ETD TLV 38 into an R-APS "OK" message (step S110), and forwards the message out both ports, such as one specified by ITU-T G.8032. R-APS messages with the new ETD TLV can follow the same forwarding and loop avoidance procedures defined by the ITU-T G.8032 specification The exemplary operational flowchart of FIG. 5 describes steps performed by each remaining, or tandem, node of the Ethernet Ring ring 10 when the ring 10 is operating in a Normal State. Each node receives an R-APS "OK" message at one of its ports 14, 16 (step SI 14), wherein the R-APS "OK" message has been forwarded to the node by its neighboring node. The route director 32 of the receiving node extracts the topology contents of the ETD TLV 38 and uses that information to update its normal state topology table 36 (step S 116). The route director 32 appends the signature of the current node to the received ETD TLV 38 (step S118) and increments the node count by one (step S120) before forwarding the R-APS "OK" message out of the "mate" ring port, i.e., the port that did not receive the message, such as one defined by ITU-T G.8032 (step S122). It should be noted that each receiving node repeats the process of FIG. 5 twice for each automatic discovery request initiated by the RPL owner node 12a, each receiving node receives an R-APS "OK" message at each of its two ports 14, 16. Given that the ring 10 has a fixed topology, the sequence of nodes 12 that tandem an R-APS message with the ETD TLV 38 sourced by a given node indicates the relative distance from the source node, i.e., the node count in the ETD TLV 38.

Figure 5:
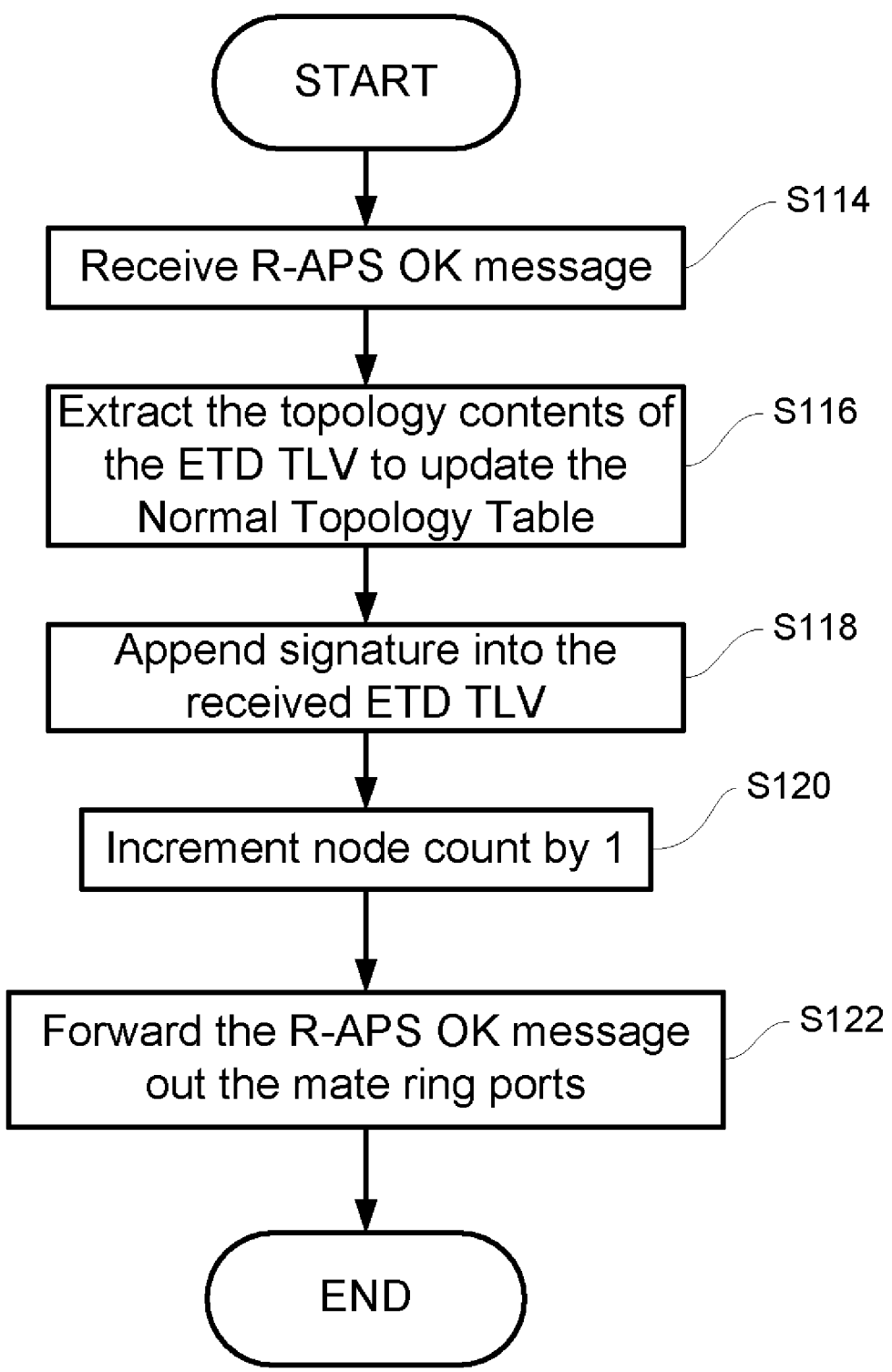
FIG. 5 is a flowchart of an exemplary Ethernet ring auto discovery process performed by each tandem node on an E-Spring ring during a NORMAL state according to the principles of the present invention.
Figure 6:
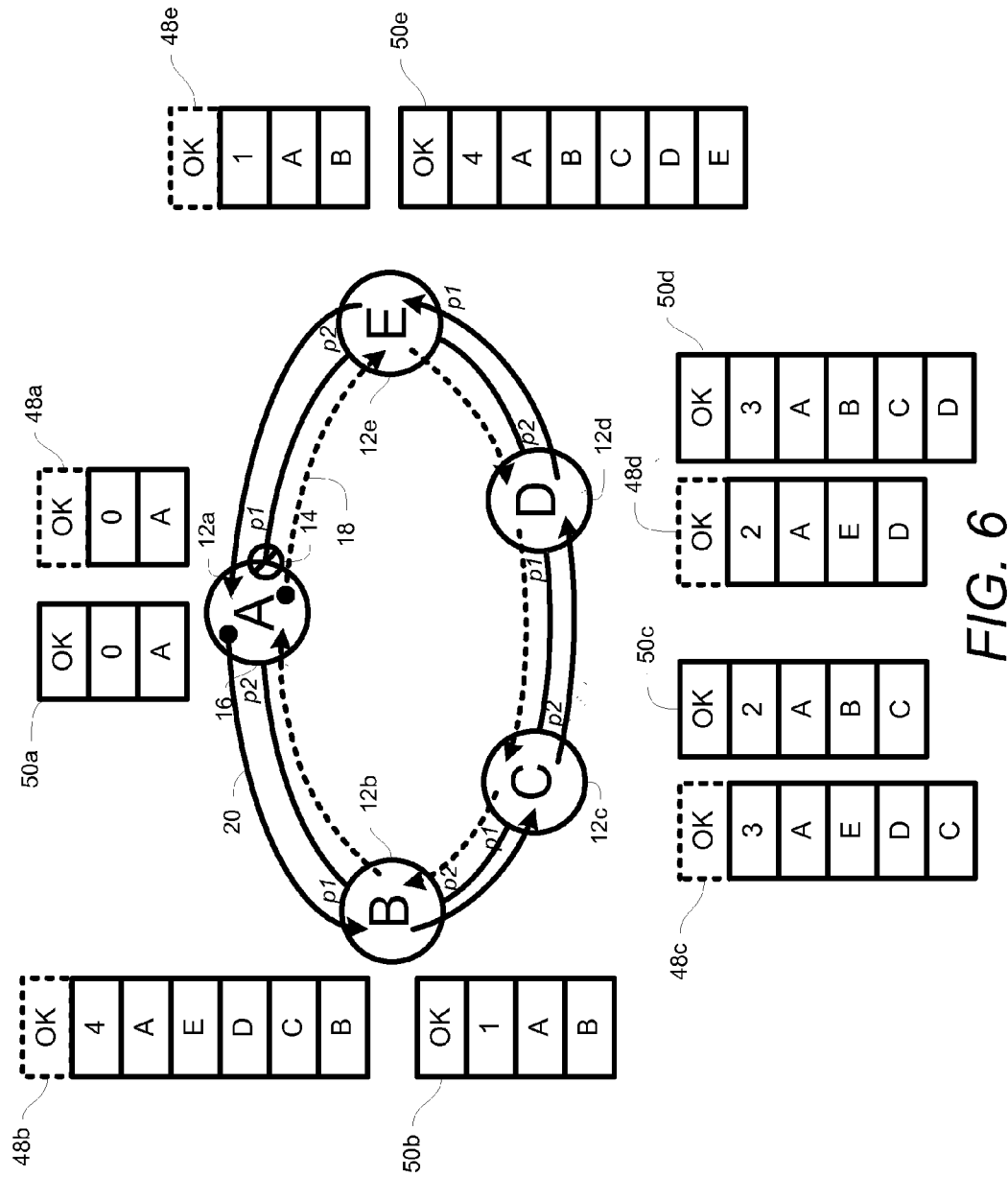
FIG. 6 is a control diagram of an exemplary Ethernet ring topology discovery mechanism operating during a NORMAL state according to the principles of the present invention.

FIG. 6 is a control diagram illustrating an exemplary Ethernet ring topology discovery mechanism operating during a NORMAL state using the processes defined in FIGS. 3 and 5. In FIG. 6, node A 12a is the RPL owner node, thus its port p1 is blocked. Node A 12a initiates R-APS "OK" messages containing nodal information and transmits these messages out both ports along paths 18 and 20. Nodal information originating or appended at each node 12 is shown in FIG. 6 in chart form. Charts 48a, 48b, 48c, 48d and 48e (referenced collectively as chart 48) contain information added at each node 12 along path 18. Charts 50a, 50b, 50c, 50d and 50e (referenced collectively as chart 50) contain information added at each node 12 along path 20. When each node 12 has received an R-APS "OK" message at both ports 14, 16, then each node 12 in the ring 10 has a complete topology of the entire ring 10.

Figure 7:
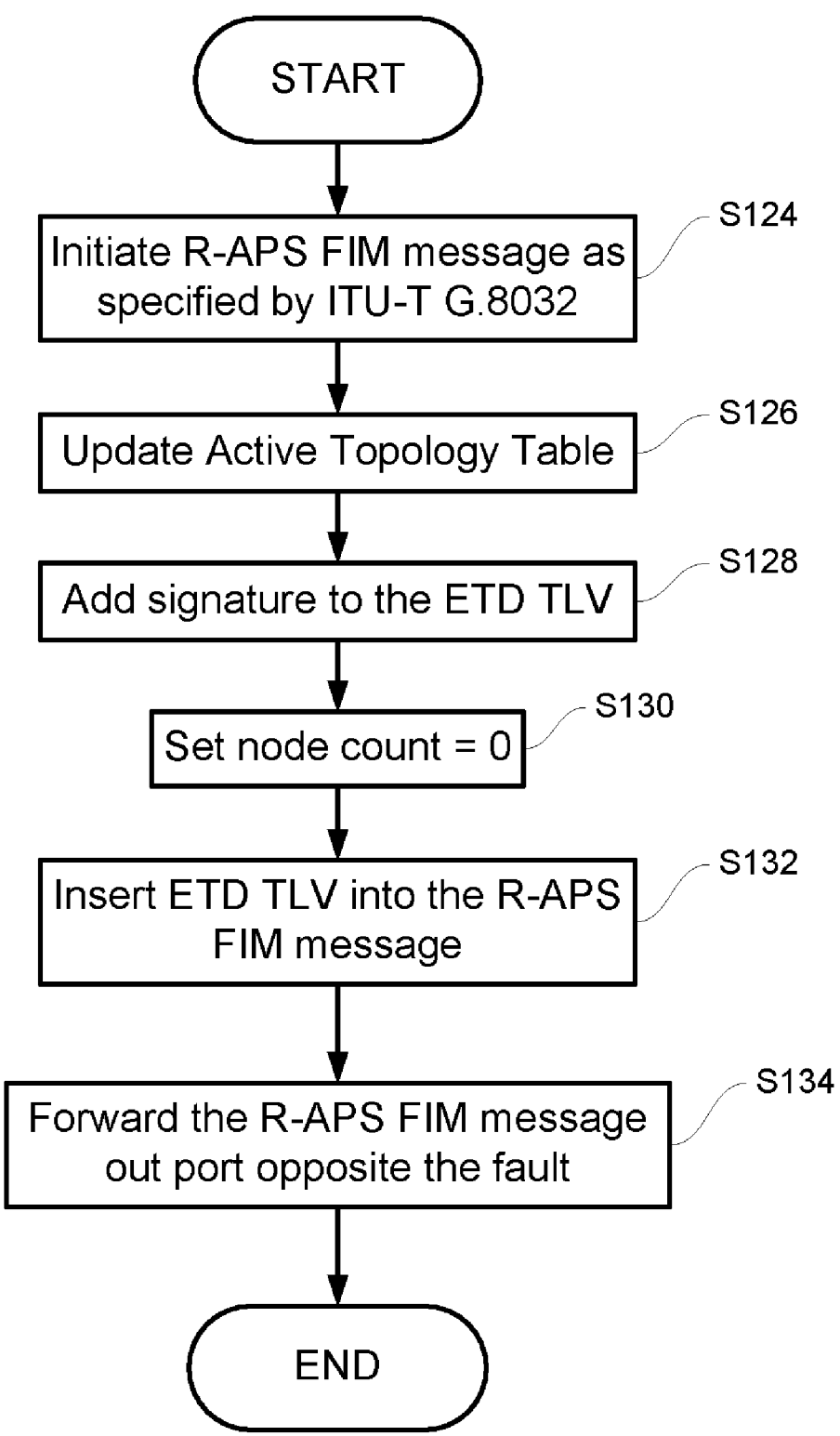
FIG. 7 is a flowchart of an exemplary Ethernet ring auto discovery process performed by a node adjacent to a fault during a PROTECT state according to the principles of the present invention.
Figure 8:
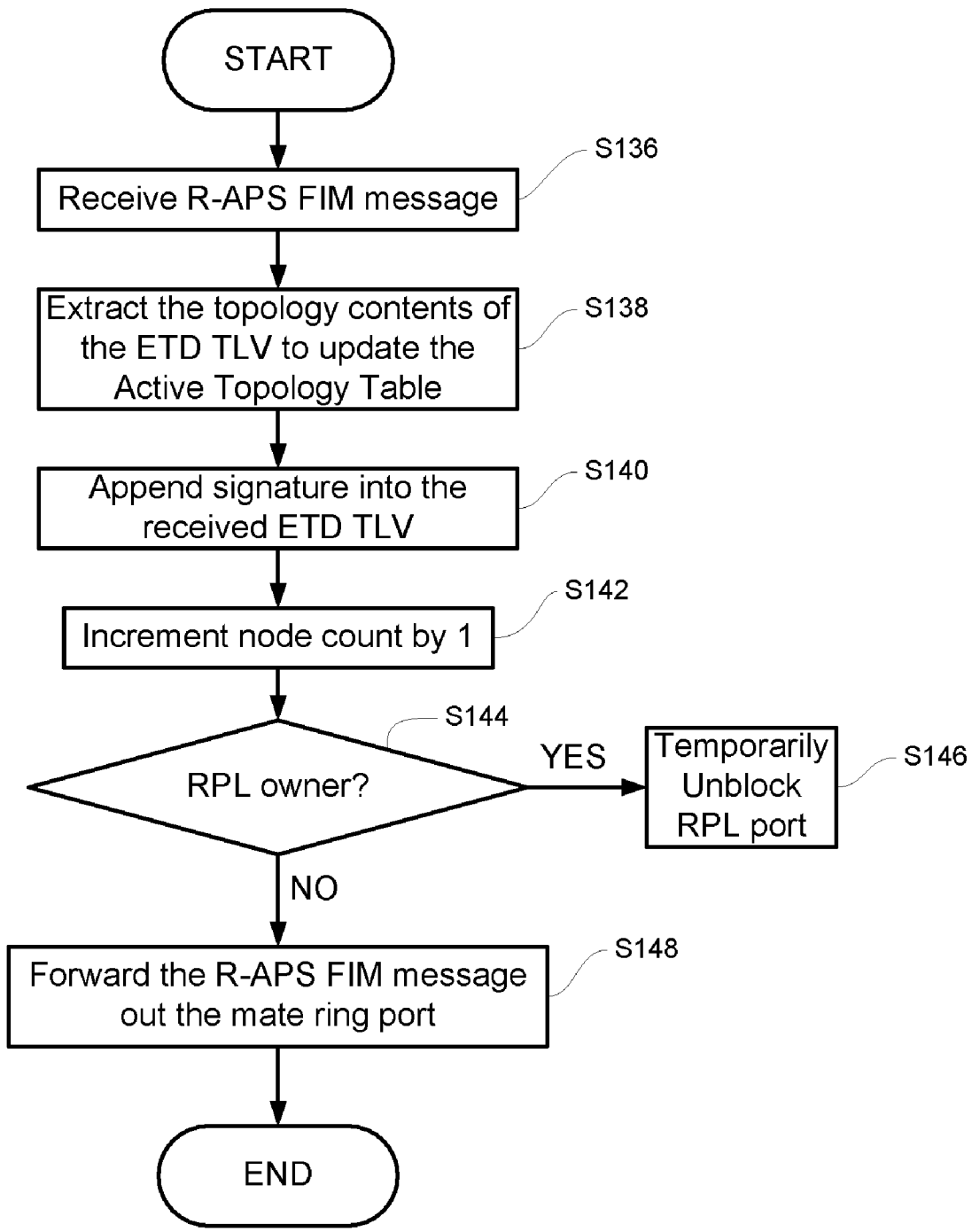
FIG. 8 is a flowchart of an exemplary Ethernet ring auto discovery process performed by each tandem node on an E-Spring ring during a PROTECT state according to the principles of the present invention.
Figure 9:
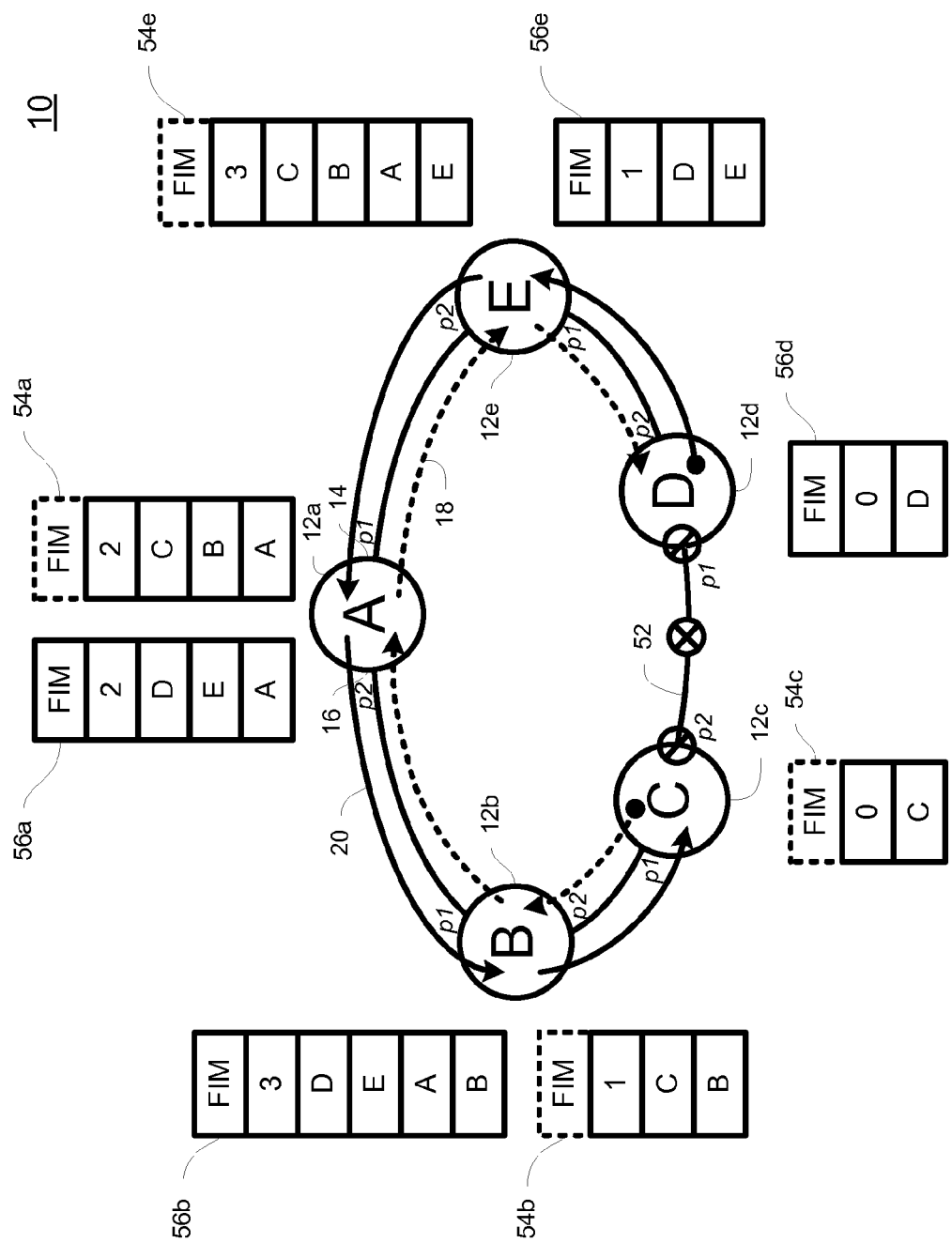
FIG. 9 is a control diagram of an exemplary Ethernet ring topology discovery mechanism operating during a PROTECT state according to the principles of the present invention.

The methodology described above in relation to an E-SPRing NORMAL state may be similarly applied to detect a fault in the ring. Referring now to FIGS. 7-9, the use of the ETD TLV 38 mechanism may also be used in the PROTECT and PENDING states in conjunction with Failure Indication Messages ("FIM") and Recovery Indication Messages ("RIM"), respectively. In FIG. 7, an exemplary operational flowchart is provided that describes steps performed by a route director 32 of a node 12 adjacent to a failed link for automatically discovering the ring topology when the ring 10 enters into a PROTECT State.

Beginning at step S124, the route director 32 of each node adjacent to a failed link initiates an R-APS "FIM" message, such as one specified in ITU-T G.8032. In the control flow diagram of FIG. 9, node C 12c and node D 12d are adjacent to failed link 52, thus both node C 12c and node D 12d follow the process outlined in FIG. 7. The route director 32 updates the active state topology table to reflect the failed link 52 (step S126), adds the signature of the node to the ETD TLV 38 (step S128), and sets the node count field 44 of the ETD TLV 38 equal to zero (step S130). The route director 32 inserts the ETD TLV 38 into the "FIM" message (step S132) and the communication interface 22 forwards the "FIM" message out the port opposite the fault, e.g., failed link 52, such as one specified by ITU-T G.8032 (step S134).

Turning now to FIG. 8, an exemplary operational flowchart is provided that describes steps performed by a route director 32 of each tandem node 12 of the Ethernet Ring ring 10, i.e., all nodes not adjacent to a failed link, for automatically discovering the ring topology when the ring 10 enters into a PROTECT State. Each node receives an R-APS "FIM" message at one of its ports 14, 16 (step S136), wherein the R-APS "FIM" message has been forwarded to the node by its neighboring node. The route director 32 of the receiving node extracts the topology contents of the ETD TLV 38 and uses that information to update its active state topology table 34 (step S138). The route director 32 appends the signature of the current node to the received ETD TLV 38 (step S140) and increments the node count by one (step S142). If the receiving node is the RPL owner node (step S144), the communication interface 22 temporarily removes the block from the RPL port (step S146). The communication interface 22 forwards the R-APS "FIM" message out of the "mate" ring port, i.e., the port that did not receive the message, such as one defined by ITU-T G.8032 (step S146).

FIG. 9 is a control diagram illustrating an exemplary Ethernet ring topology discovery mechanism operating during a PROTECT state using the processes defined in FIGS. 7 and 8. In FIG. 9, the link 52 between node C 12c and node D 12d has failed, therefore, both node C 12c and node D 12d initiate R-APS "FIM" messages containing nodal information and transmit these messages out the port opposite the failed link 52, i.e., port p1 for node C 12c and port p2 for node D 12d, along paths 18 and 20. Nodal information originating or appended at each node 12 is shown in FIG. 9 in chart form. Charts 54a, 54b, 54c and 54e (referenced collectively as chart 54) contain information added at each node 12 along path 18. Charts 56a, 56b, 56d and 56e (referenced collectively as chart 50) contain information added at each node 12 along path 20. When each tandem node 12b, 12a, 12e has received an R-APS "FIM" message at both ports 14, 16, and each originating node 12c, 12d have received an R-APS "FIM" message at the port opposite failed link 52, then each node 12 in the ring 10 has a complete topology of the entire ring 10.

When the failed link 52 has been reestablished, the procedures of FIGS. 7 and 8 are primarily performed once again upon entering a "PENDING" state, except that the nodal information provided in an ETD TLV of a "FIM" message, is now sent in a "RIM" message. In other words, the nodes originally initiating transmission of "FIM" messages originate "RIM" messages and forward these messages out the port opposite the previously failed link 52. It should be noted that the RPL owner node reestablishes a block on the RPL port once it has received "RIM" messages on both of its ports.

Although described above in relation to the E-SPRing protocol, application of this mechanism and the R-APS message extensions may be applied to any Ring based protocol.

Figure 10:
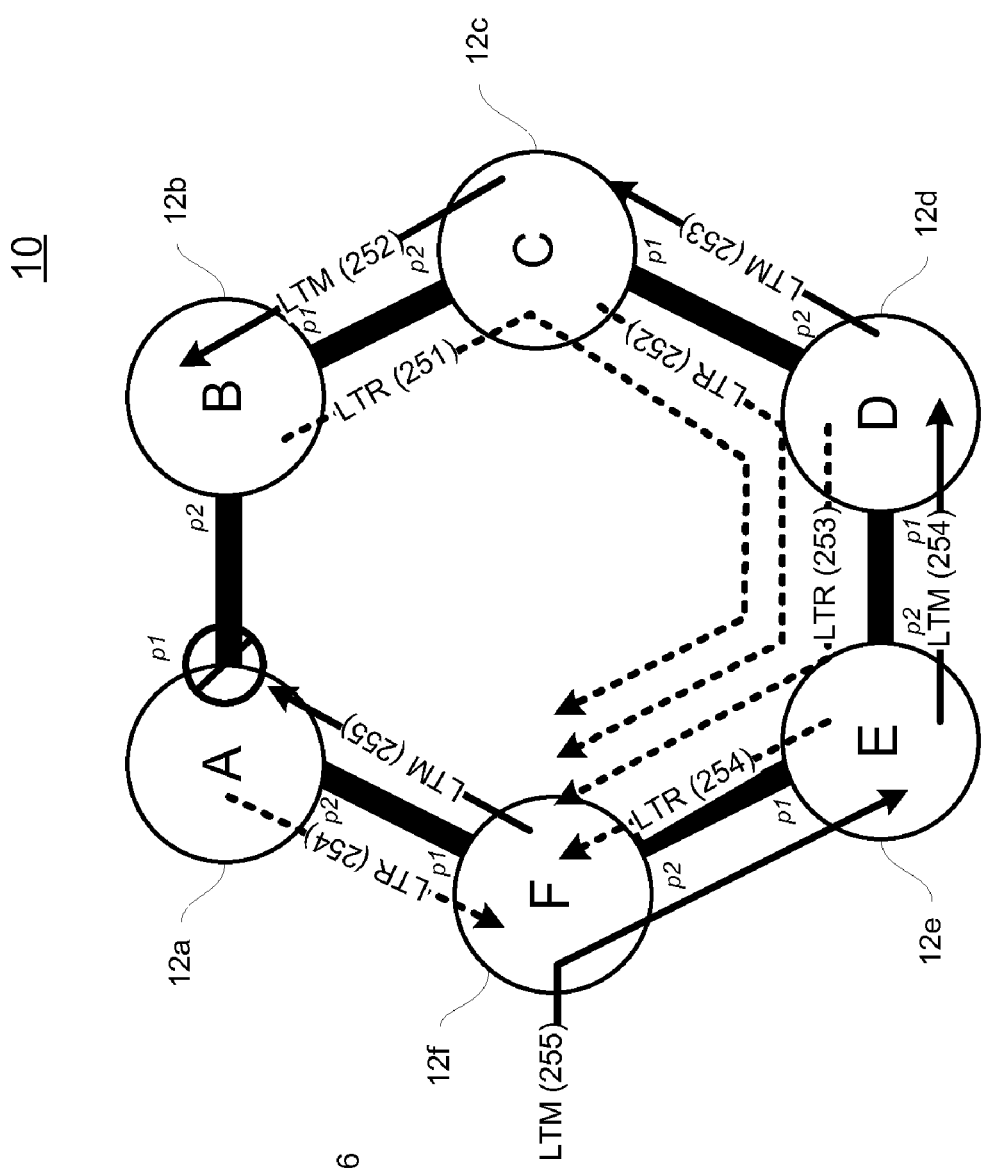
FIG. 10 is a block diagram of an exemplary Ethernet ring using an alternative automatic discovery mechanism constructed in accordance with the principles of the present invention.
Figure 11:
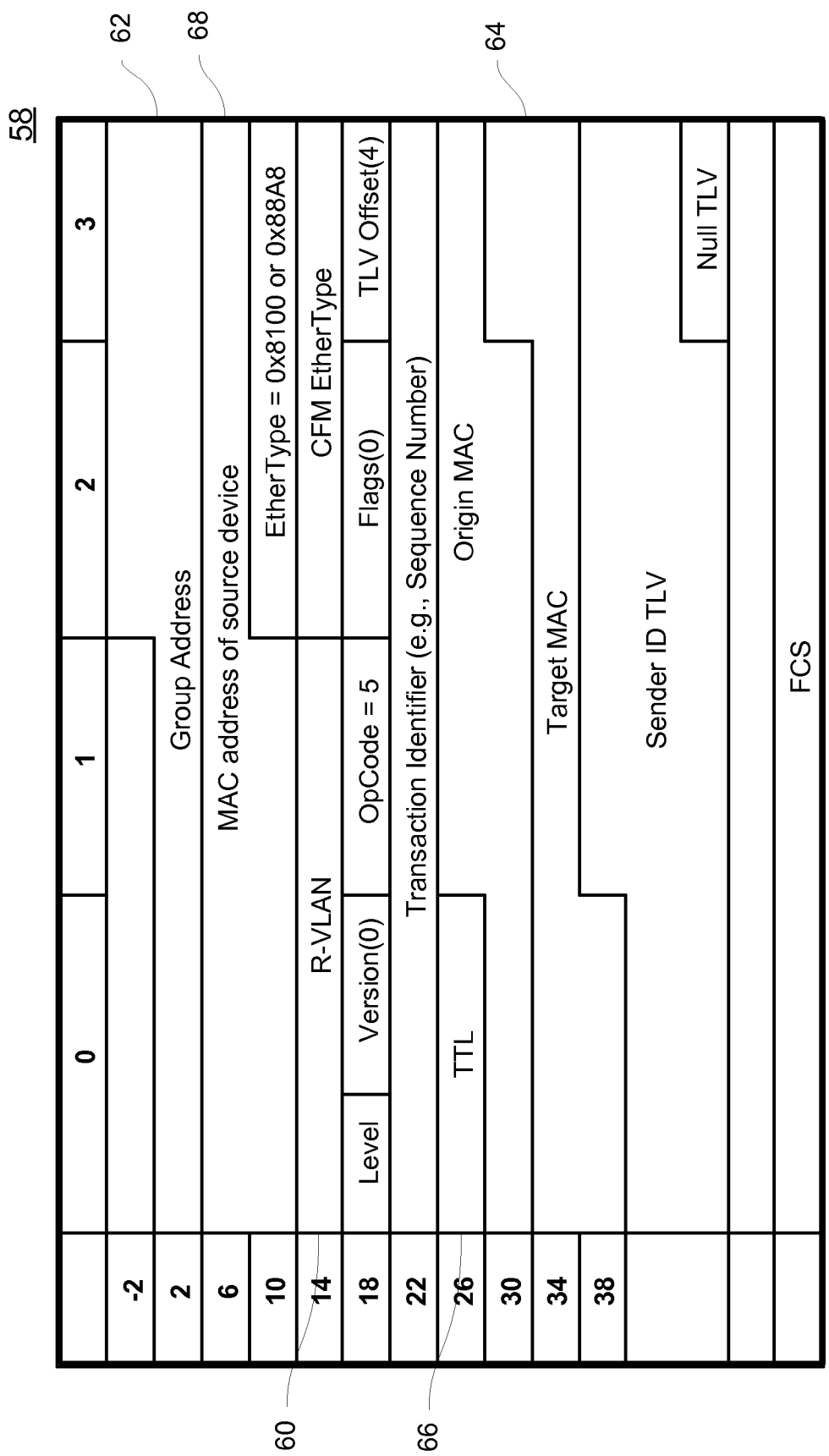
FIG. 11 is an exemplary Ring Trace Message constructed in accordance with the principles of the present invention.

Referring now to FIG. 10, an alternative embodiment of the present invention provides another mechanism for automatic ring topology discovery. In this embodiment, the IEEE 802.1ag Linktrace protocol is utilized over the Ethernet Ring to determine the ring topology. This mechanism inserts an R-APS Virtual Local Area Network Identifier ("VID") 60 into each LinkTrace message, i.e., ETH-LTM, to identify the ring, as shown in the exemplary LTM 58 of FIG. 11. The utilization of the R-APS VID in the message ensures that LinkTrace information is collected for the designated Ethernet Ring. The Ethernet Ring reserved group address is used as the Destination Address ("DA") and designated in the group address field 62. The utilization of the Ethernet Ring reserved group address ensures that all related LinkTrace messages stay local to the ring. It should be noted that under the currently proposed IEEE 802.1ag protocol, the Target MAC 64 is specified as a unicast address. However, to implement this mechanism, the Target MAC address 64 should be a group address.

Figure 12:
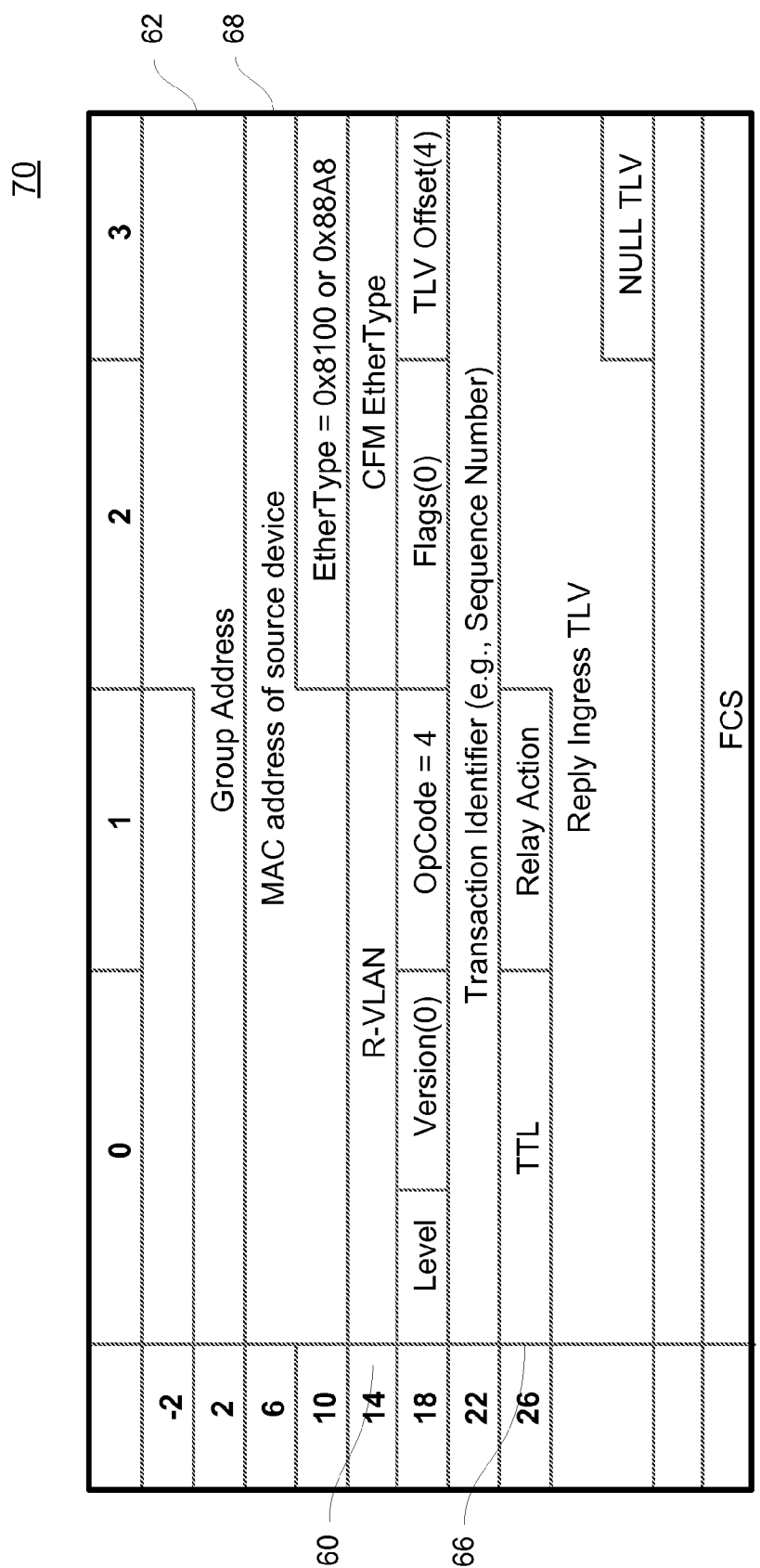
FIG. 12 is an exemplary Ring Trace Reply Message constructed in accordance with the principles of the present invention.

This embodiment advantageously uses the Time-to-Live ("TTL") field 66 of the LTM 58 to determine the relative distance of each node 12 in the Ethernet Ring 10 from an originating node. An initiating node, e.g., node F 12f in FIG. 10, sends the LTM 58 out each of its ports 14, 16. All other nodes 12 in the ring 10 respond back to the originating node, through the same port in which the LTM 58 was received, with a LinkTrace Reply ("LTR") message, and forward the LTM 58 to the next node in the ring 10 through the mate port. An exemplary LTR message 70 is provided in FIG. 12. It should be noted that the values of the R-VLAN field 60 and the Group address field 62 of the LTR 70 are the same as in the original LTM 58; however, the value of the MAC address of source device field 68 changes to reflect the receiving node. Each node 12 decrements the value of TTL field 66 when either an LTM 58 or an LTR 70 arrives at the node 12. Because the ring topology is fixed, the value of the TTL field 66, along with the MAC Address of the source device 68, is used to determine the position of each node 12 in the ring 10.

An originating node creates an LTM 58 and transmits the LTM 58 out both ports 14, 16. When the neighboring nodes receive the LTM 58, each node decrements the TTL value, creates a LTR 70 having the same TTL value as the current LTM 58, transmits the LTR 70 through the same port that received the LTM 58, and forwards the LTM 58 on to the next neighboring node in the ring 10. When a non-originating node receives an LTR 70 from a neighboring node, it decrements the TTL value and forwards the LTR 70 through the opposite (mate) port, back toward the originating node.

Figure 13:
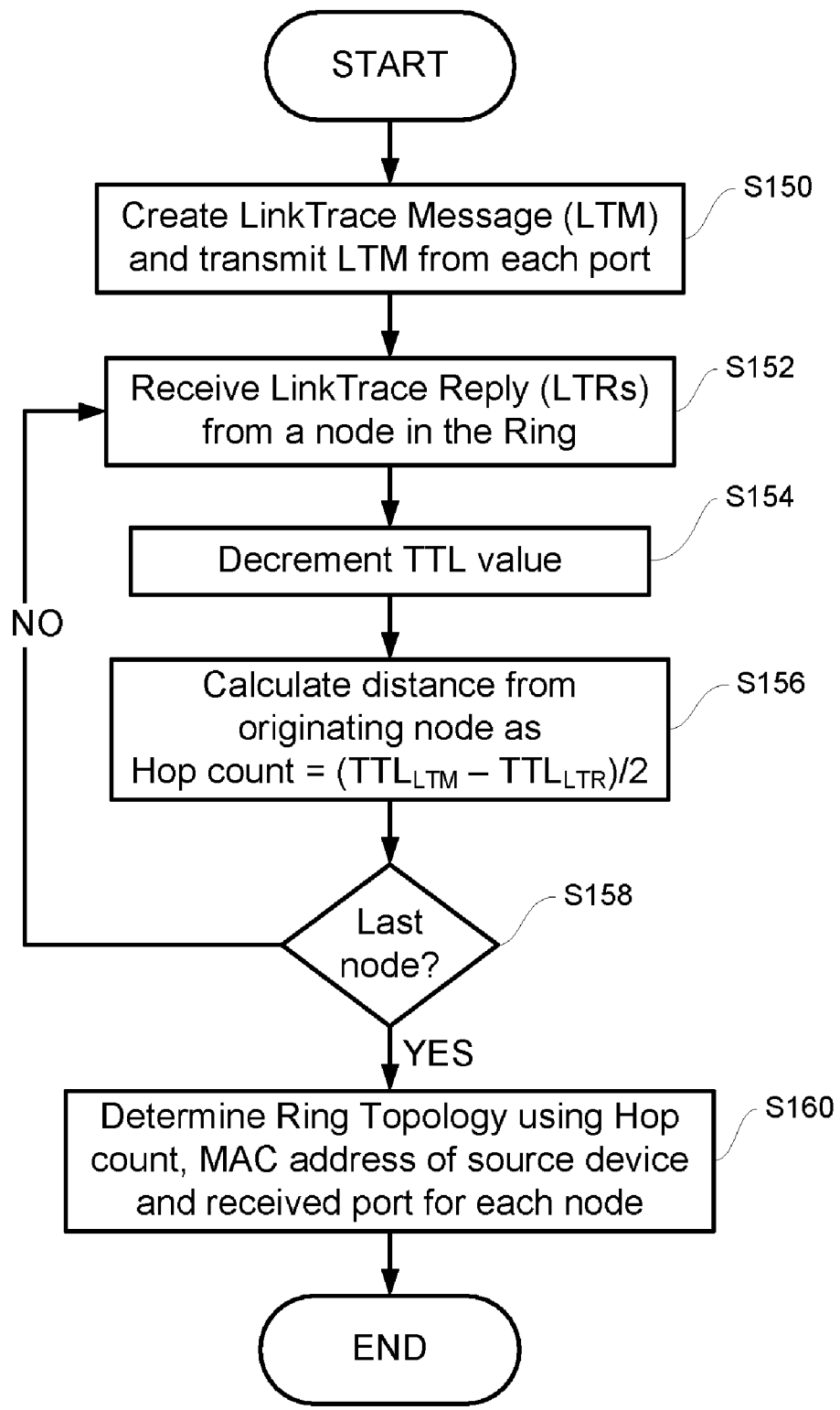
FIG. 13 is a flowchart of an exemplary Ethernet ring auto discovery process performed by an originating node according to an alternative embodiment of the present invention.
Figure 14:
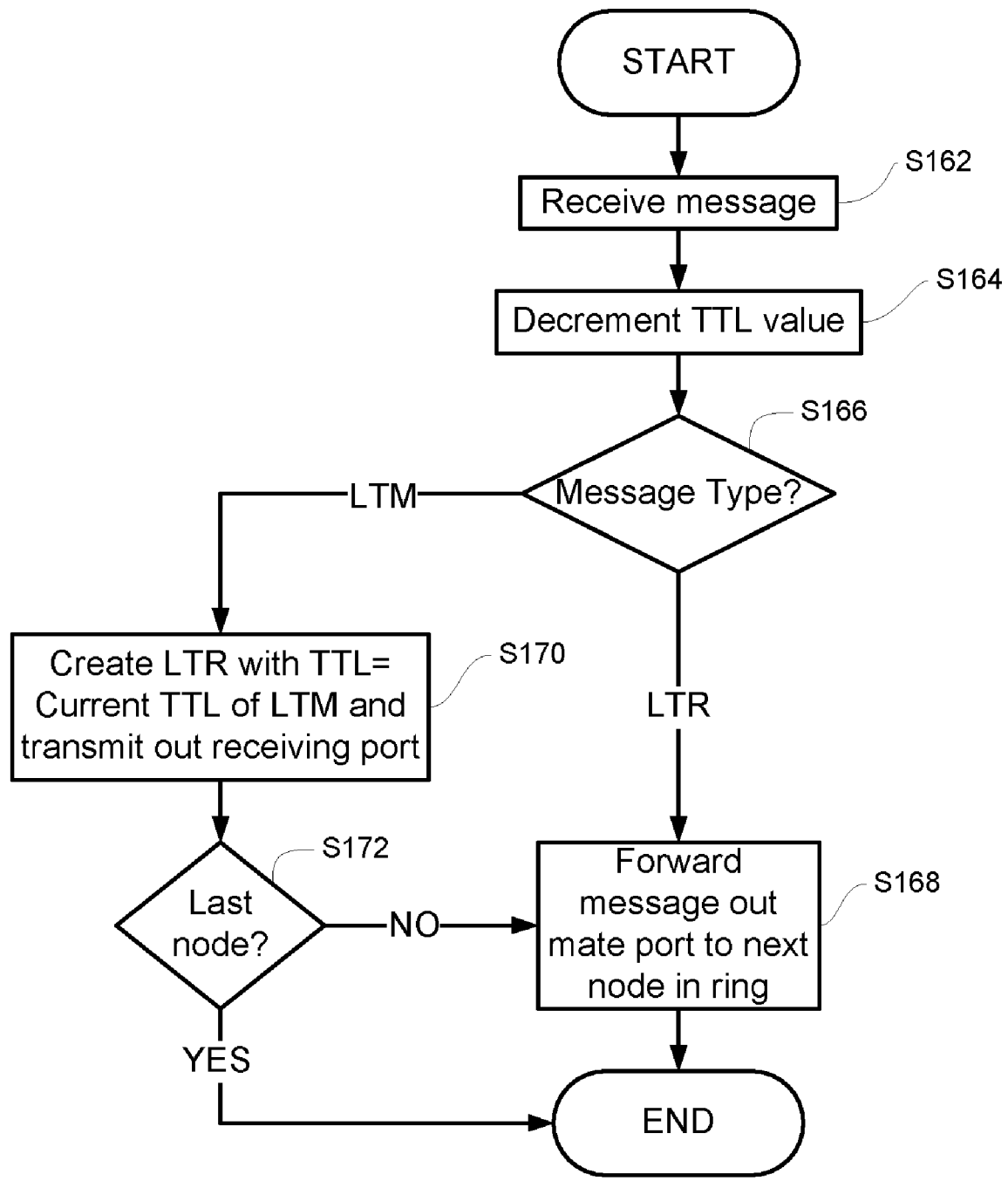
FIG. 14 is a flowchart of an exemplary Ethernet ring auto discovery process performed by a responding node according to an alternative embodiment of the present invention.

Referring now to FIGS. 13 and 14, exemplary operational flowcharts are provided which describe steps performed by the ring nodes 12 to automatically discover the ring topology. FIG. 13 details steps performed by an initiating node. The initiating node creates a LTM and transmits the LTM through each port (step S150). In response to the LTM, the initiating node receives an LTR from another node in the ring (step S152). The initiating node decrements the current TTL value of the LTR (step S154), and calculates the distance of the node sending the LTR from the originating node (step S156), i.e., the "hop count (H)" according to the equation:

$$H = (TTL_{LTM} - TTL_{LTR})/2 \quad (1)$$

When all of the nodes in the ring have responded (step S158), the initiating node determines the overall ring topology using the hop count, the MAC address of the source device and the port through which the LTR was received (step S160).

FIG. 14 details steps performed by each remaining node of the ring. A node receives a message through one of its ports (step S162) and decrements the TTL value (step S164). If the message is a LTR (step S166), the node simply forwards the message out the mate port to the next neighboring port (step S168). If the message is a LTM (step S166), the node creates a LTR, sets the TTL value of the LTR equal to the present TTL value of the LTM and transmits the LTR back through the receiving port (step S170). If the node is the last node in the ring (step S172), the process ends. However, if there are other remaining nodes in the ring (step S172), the node forwards the message out the mate port to the next neighboring port (step S168).

As an example, referring back to FIG. 10, node F 12f originates an LTM message 58 having a TTL value of 255 and forwards the LTM 58 to node E 12e and node A 12a. Node A 12a receives the LTM 58, decrements the TTL value to 254, creates an LTR 70 having a TTL value of 254, and forwards the LTR 70 back to node F 12f. As node A 12a is the RPL owner node, it is the "last" node in the ring, node A 12a has now completed its task. When node F 12f receives the LTR 70 from node A 12a, it decrements the TTL value to 253 and determines the hop count for node A 12a, e.g., H=(255−253)/2=1. Thus, node F 12f knows that node A 12a is 1 hop away through port p1.

When node E 12e receives the LTM 58, it replies in the same fashion as node A 12a, but also forwards the LTM 58 on to neighboring node D 12d. As above, node F 12f now knows that node E 12e is 1 hop away through port p2. When node D 12d receives the LTM 58, it decrements the TTL value again (TTL=253), returns a LTR 70 to node E 12e having a TTL value that is equal to the current TTL value, i.e., 253, and forwards the LTM 58 to node C 12c. When node E 12e receives the LTR 70 from node D 12d, it decrements the TTL value (TTL=252) and forwards the LTR 70 on to node F 12f. Again, node F 12f decrements the TTL value (TTL=251) and calculates the hop count (H=(255−251)/2=2). This process continues until node F 12f has discovered every node in the ring and determined the position of each node.

Figure 15:
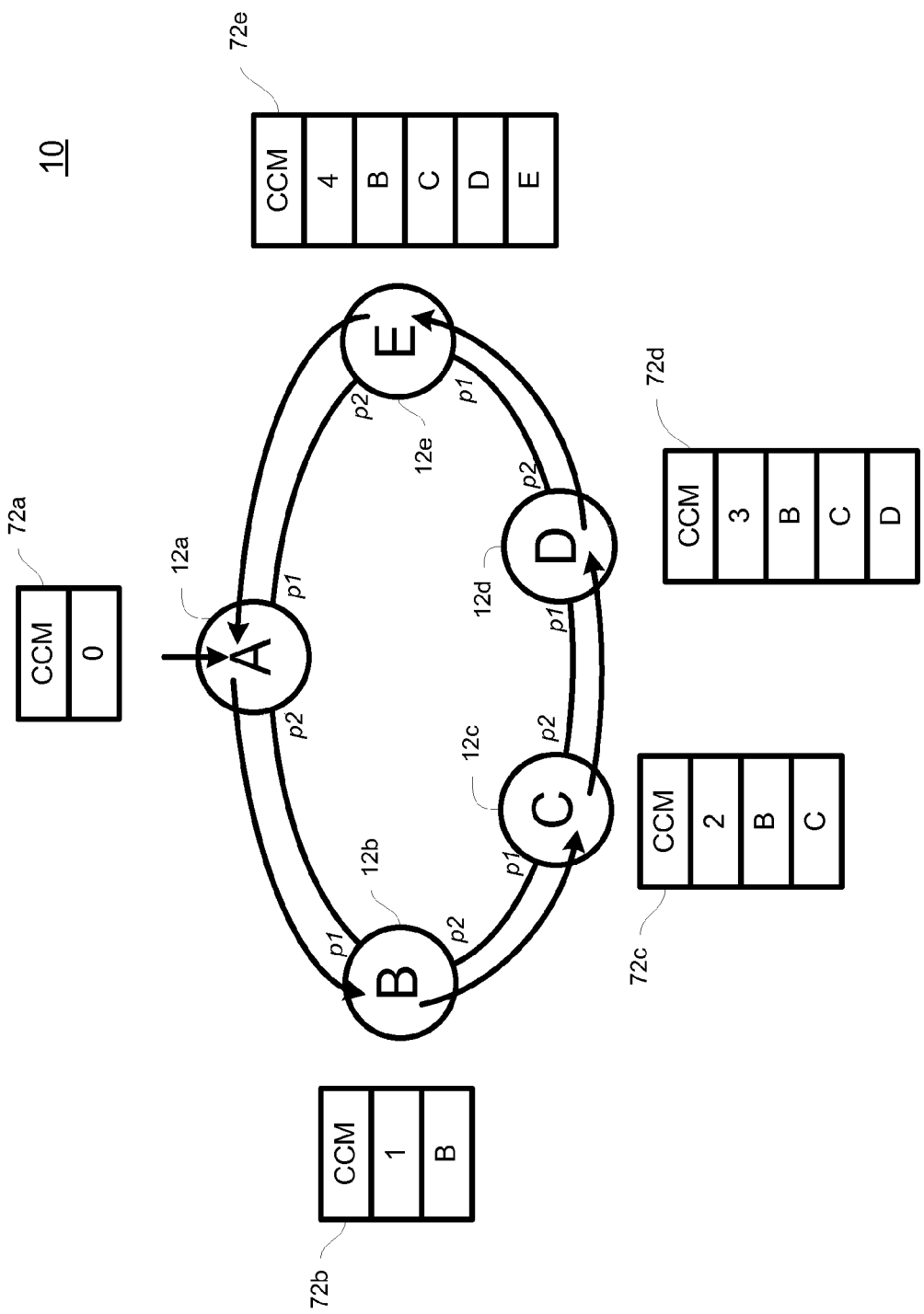
FIG. 15 is a block diagram of an exemplary Ethernet ring using another alternative automatic discovery mechanism constructed in accordance with the principles of the present invention.

Referring now to FIG. 15, another alternative embodiment of the present invention provides another mechanism for automatic ring topology discovery. In this embodiment, messages such as the IEEE 802.1ag tag continuity check messages ("CCM") are used to determine the ring topology. Given that the ring is a fixed topology, the sequence of nodes that transmit a CCM sourced by a given node indicates the relative hop distances. This mechanism employs a special "Auto Discovery" CCM ("AD_CCM") for use by intermediate nodes forwarding a CCM sourced by a given node. The intermediate nodes append a signature, such as the MAC address of the intermediate node, before transmitting the AD_CCM to the next node. As the listing of signatures in the AD_CCM grows, the topology of the ring is revealed. A representation of the signature listing 72 for each node 12 is shown in FIG. 15 beside its corresponding node 12. In other words, listing 72a corresponds to node A 12a, listing 72b corresponds to node B 12b, etc.

Figure 16:
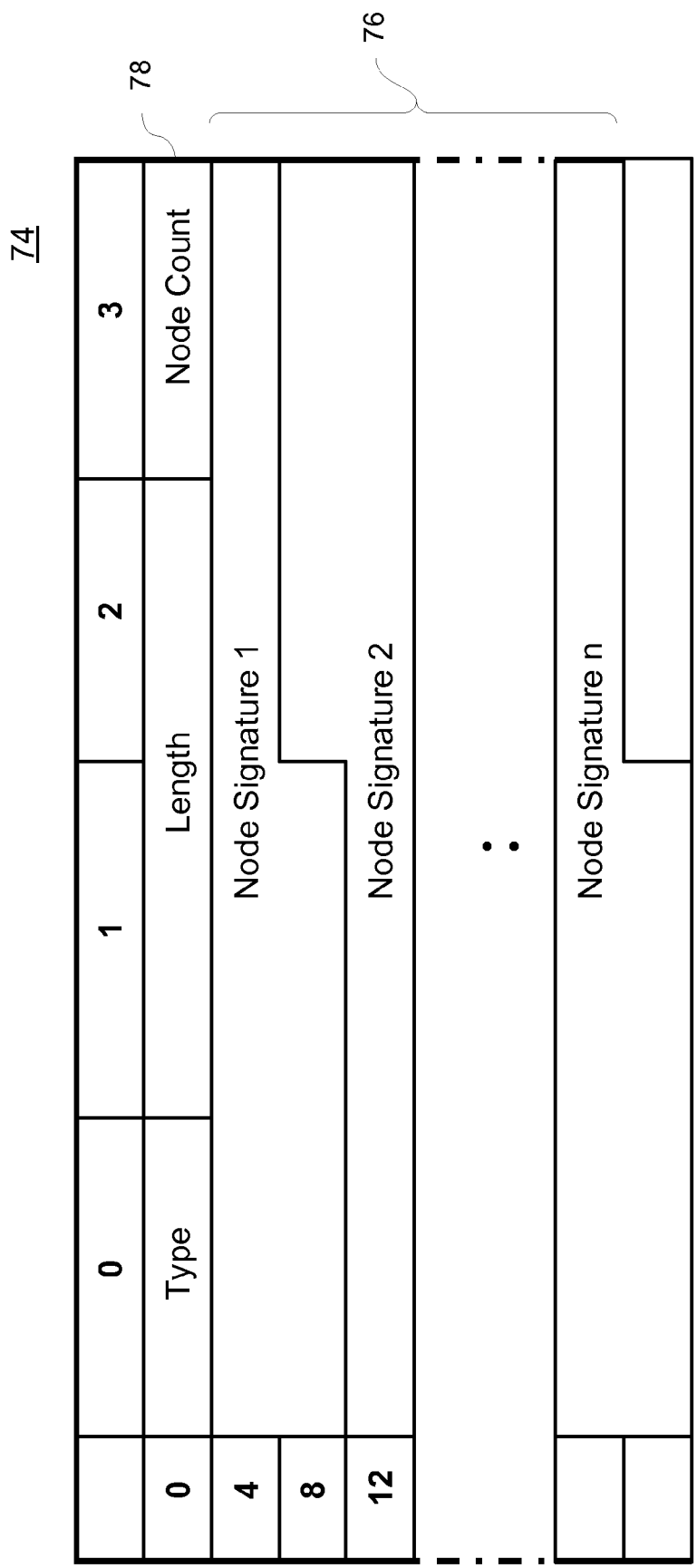
FIG. 16 is an exemplary Continuity Check Message ("CCM") Ring Trace Type-Length Value ("TLV") field constructed in accordance with the principles of the present invention.

A RingTrace TLV within the AD_CCM contains the listing of nodes discovered on the ring. An exemplary RingTrace TLV 74 is shown in FIG. 16. Each a node adds its signature 76 to the RingTrace TLV 74 upon receipt, increments the node count 78 value, and forwards the special CCM to the neighboring node through the mate port. When the special CCM completes the routing through the ring 10 and returns to the originating node, the listing contains all nodes in the ring and the position of each node.

Figure 17:
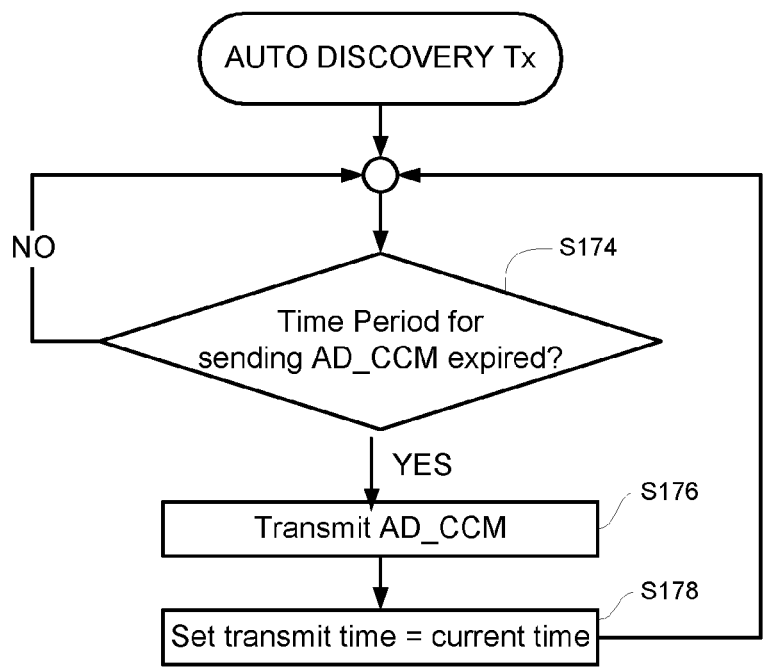
FIG. 17 is a flowchart of an exemplary Ethernet ring auto discovery process performed by an originating node according to the principles of an alternative embodiment of the present invention.

Referring now to FIGS. 17-20, exemplary operational flowcharts are provided which describe steps performed by the ring nodes 12 to automatically discover the ring topology according to this alternative embodiment of the present invention. FIG. 17 is a flowchart of an exemplary Ethernet ring auto discovery process performed by an originating node. The originating node periodically transmits an AD_CCM through the ring to verify the topology. Thus, if the time frame for sending an AD_CCM has passed (step S174), i.e. (current-Time-TxTime)≧period, the originating node transmits an AD_CCM to a neighboring node (step S176) and resets the transmit time to the current time (step S178).

Figure 18:
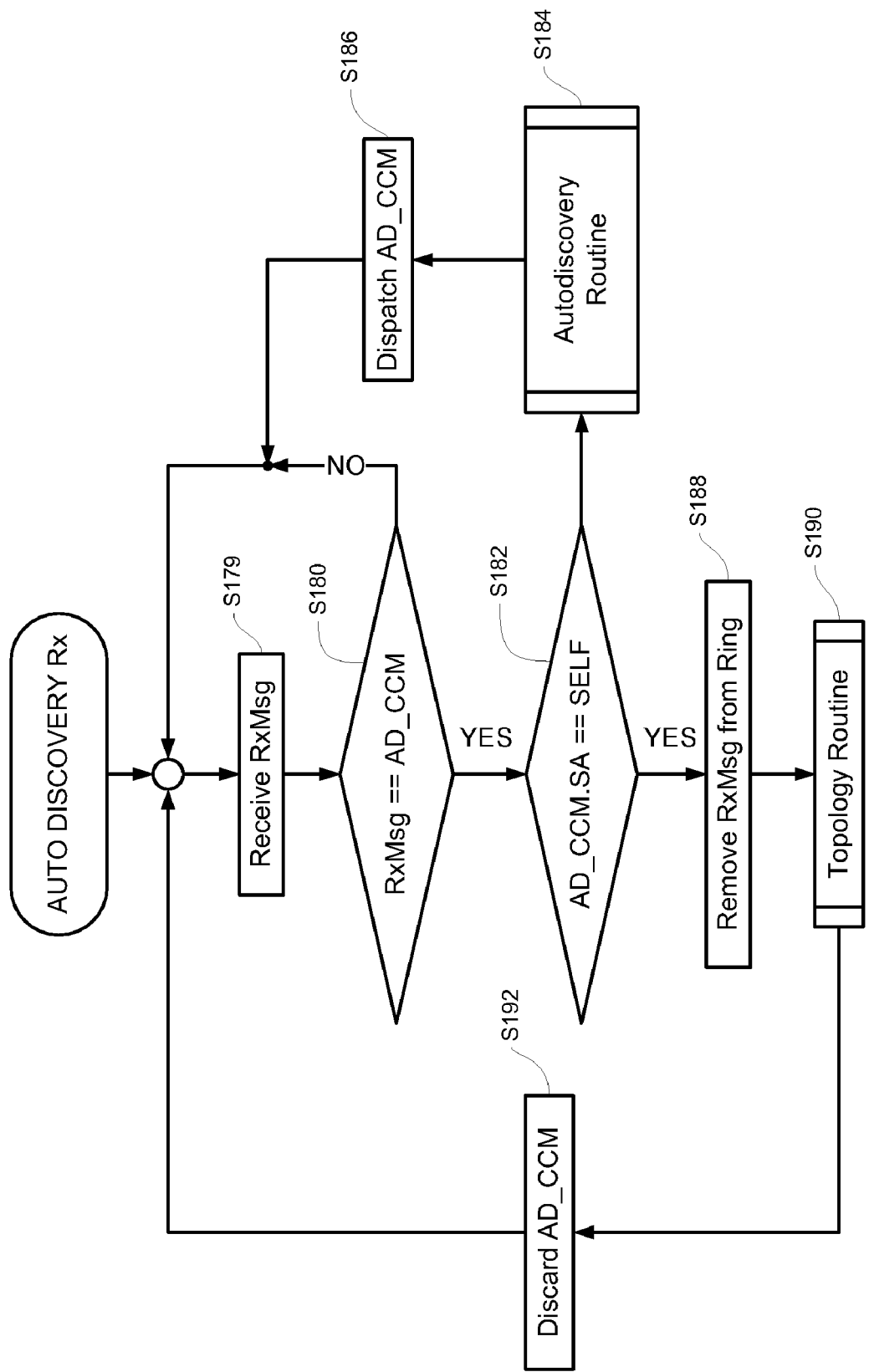
FIG. 18 is a flowchart of an exemplary Ethernet ring auto discovery process performed by a responding node according to the principles of an alternative embodiment of the present invention.

Referring to FIG. 18, an exemplary operational flowchart is provided which describes steps performed by each receiving node 12 in the ring. The process begins when a node 12 receives a message ("RxMsg") from a transmitting node (step S179), and checks to see if the received message is a special auto-discovery CCM ("AD_CCM") (step S180). If the received message is not an AD_CCM (step S180, "NO" branch), the node 12 simply waits to receive the next message. If the received message is an AD_CCM (step S180, "YES" branch), the node 12 checks to see if the AD_CCM was originated by the current node (step S182), i.e., the Source Address in the AD_CCM is the Address of the current node. If the message was not originated by the current node, the node performs an auto-discovery routine (step S184) according to the steps shown in FIG. 19, and dispatches the AD_CCM out the mate port to the next node in the ring (step S186). However, if the message was originated by the current node (step S182), the node removes the message from the ring (step S188) and computes the topology of the ring from the TLV information in the message as shown in FIG. 20 (step S190). The message is then discarded (step S192) and the process loops back to await the next message.

Figure 19:
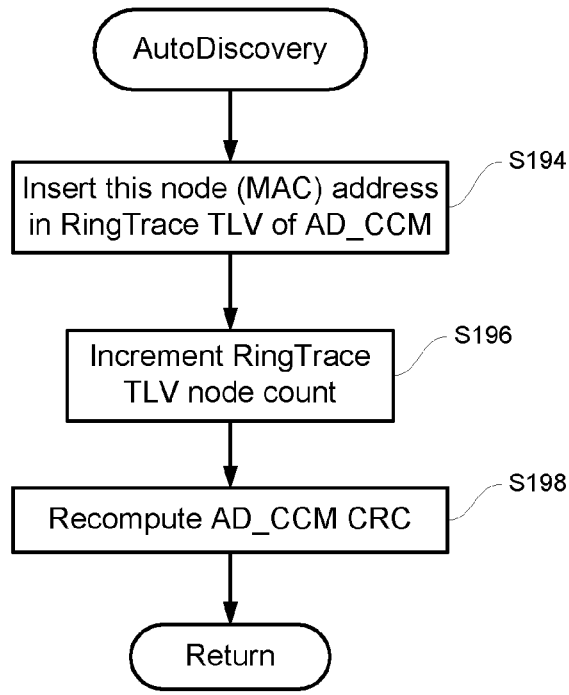
FIG. 19 is a flowchart of an exemplary Ethernet ring auto discovery process according to the principles of an alternative embodiment of the present invention.
Figure 20:
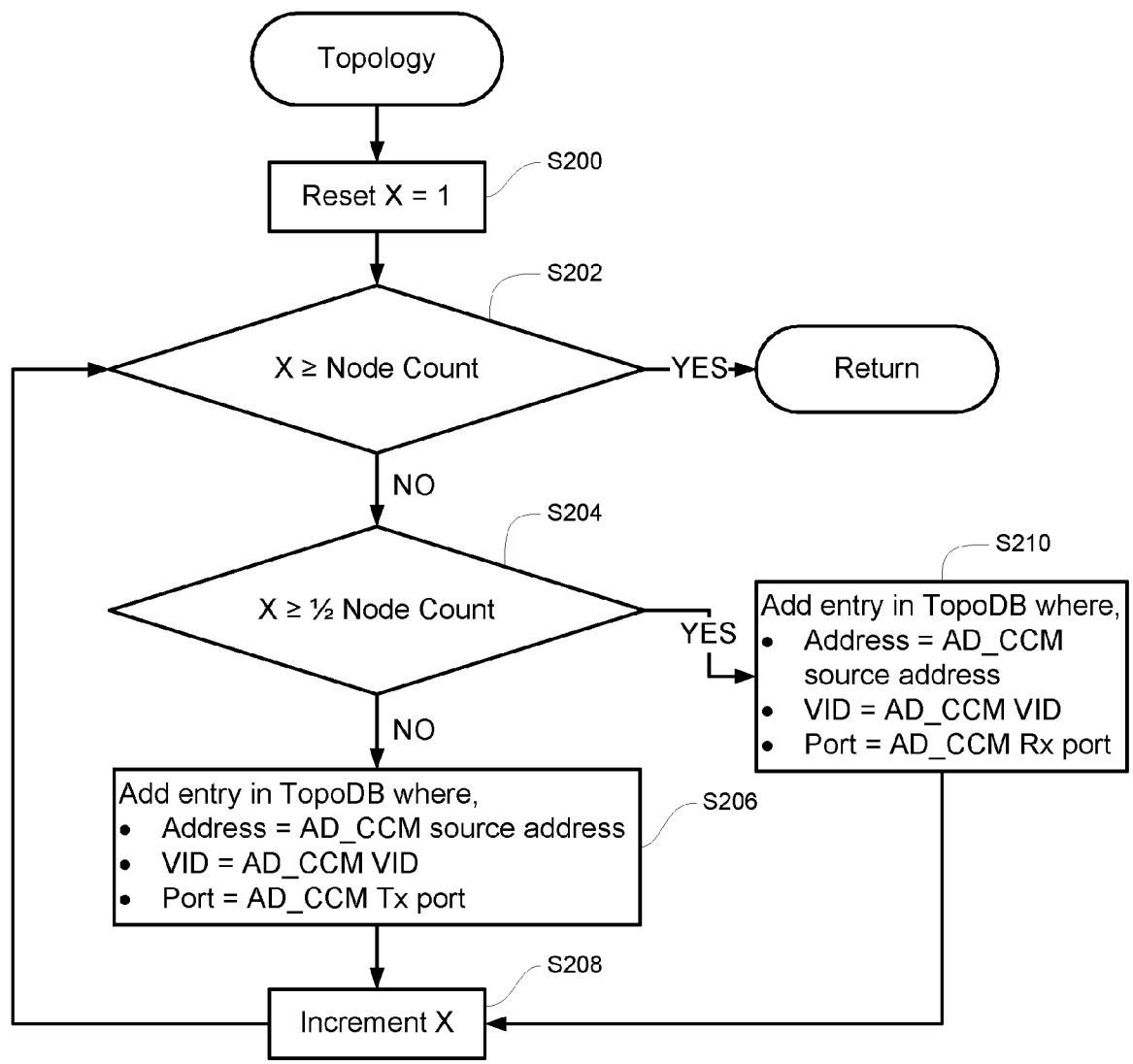
FIG. 20 is a flowchart of an exemplary Ethernet ring topology discovery process according to the principles of an alternative embodiment of the present invention.

Turning now to the auto-discovery routine shown in FIG. 19, the receiving node appends its Media Access Control ("MAC") address to the list of signatures in the RingTrace TLV of the AD_CCM (step S194) and increments the node count value in the RingTrace TLV by one (step S196). The node recomputes the cyclic redundancy check ("CRC") for the AD_CCM (step S198).

Referring now to FIG. 20, an operational flowchart is provided which describes exemplary steps of a topology routine performed by the originating node upon receipt of the AD_CCM after cycling through the other nodes of the ring. The variable "X" is used as an index into the topology TLV that represents the node currently being processed in the message. As the process begins with the first node listed in the TLV, the value of X is reset to "1" (step S200). The node checks the node count in the TLV to determine if there is more than one node, namely itself, on the ring (step S202). In other words, if there is only 1 (or 0) node reported in the message then the "ring" only contains the originating node, so do nothing.

If there are more nodes remaining in the TLV (step S202), i.e., 2 or more nodes reported in the TLV, and if the current node being processed is in the second half of the reported nodes (step S204), then the current node is added to the topology database as existing out the port from which the message was transmitted (step S206), i.e., Address=AD_CCM source address, VID=AD_CCM VID, and Port=AD_CCM Tx port. The index value is incremented to go to the next reported node in the TLV (step S208). If there are more nodes in the TLV (step S202), continue ("NO" branch), otherwise stop and report the discovered topology ("YES" branch"). Returning to decision block S204, if the current node being processed is in the first half of the reported nodes, the node is added to the topology database as existing out the port from which the message was received (step S210), i.e., Address=AD_CCM source address, VID=AD_CCM VID, and Port=AD_CCM Rx port. As before, the index value is incremented to go to the next reported node in the TLV (step S208), and if there are more nodes in the TLV (step S202), continue ("NO" branch), otherwise stop and report the discovered topology ("YES" branch").

Figure 21:
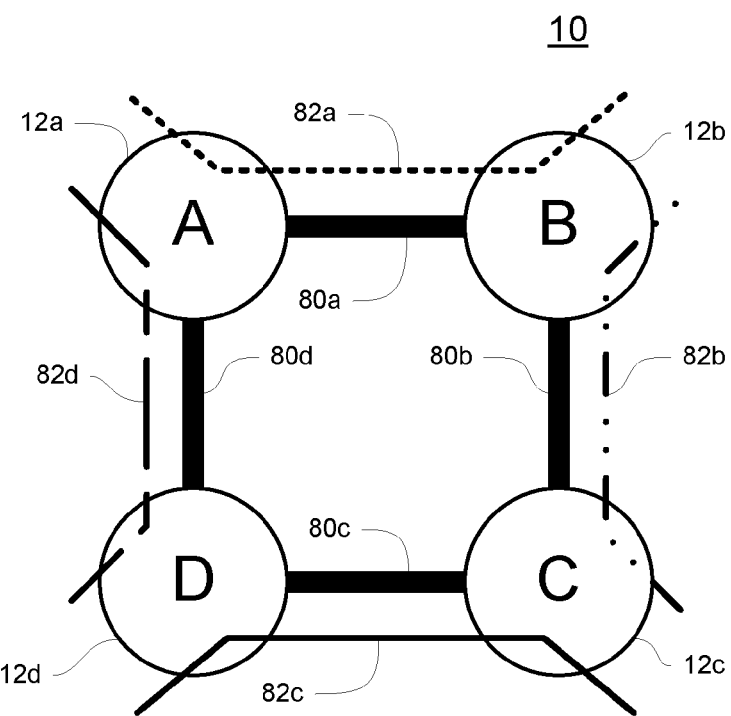
FIG. 21 is a block diagram of an exemplary Ethernet ring during a NORMAL state.
Figure 22:
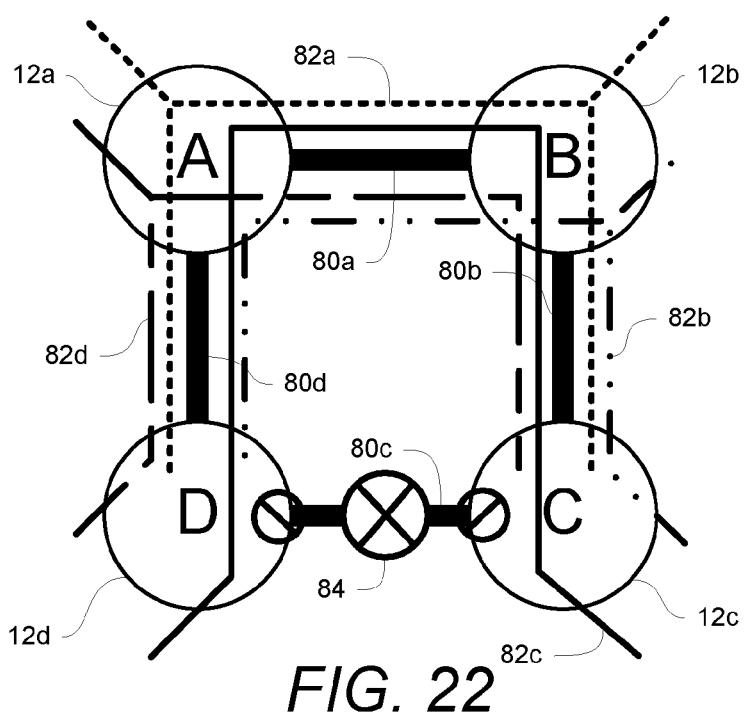
FIG. 22 is a block diagram of an exemplary Ethernet ring responding to a failure event by flooding the network.
Figure 23:
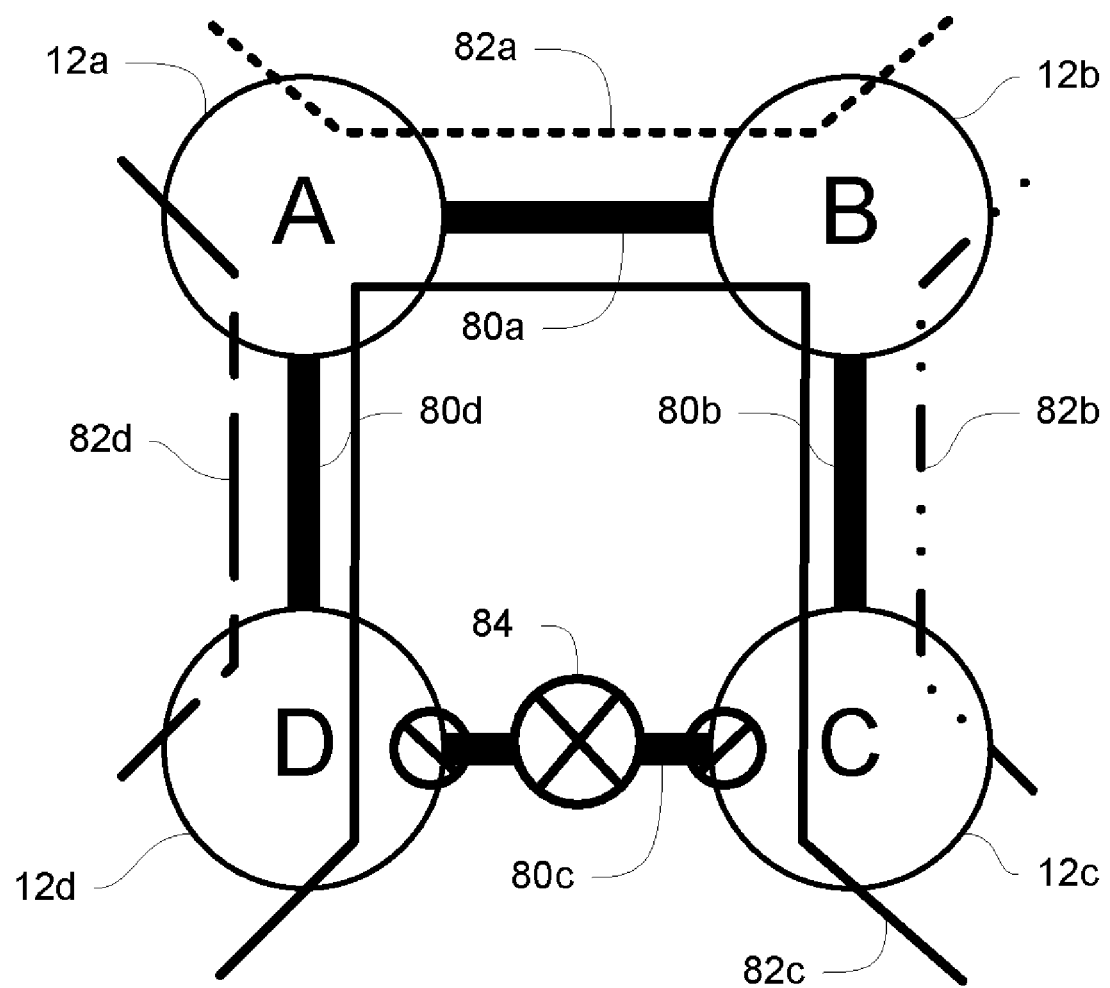
FIG. 23 is a block diagram of an exemplary Ethernet ring responding to a failure event by rerouting only a broken link according to the principles of the present invention.

The embodiments described above may be used in combination with a method of Protection and Recovery switching that prevents flooding of the ring without flushing the forwarding tables 37. FIGS. 21-23 illustrate the flooding problem which occurs as a result of flushing the forwarding tables 37. Referring to FIG. 21, a ring network 10 having four nodes 12a, 12b, 12c, 12d is shown. Forwarding tables 37 for each node instruct the node 12 as to which port to use when forwarding data to every other node in the ring. Thus, in accordance with the forwarding tables, the active communication links 80a, 80b, 80c, 80d are established between neighboring nodes 12. Communication traffic travelling between node A 12a and node B 12b flows along path 82a; traffic travelling between node B 12b and node C 12c flows along path 82b; traffic travelling between node C 12c and node D 12d flows along path 82c; and traffic travelling between node D 12d and node A 12a flows along path 82d.

FIG. 22 illustrates a scenario wherein communication link 80c between node C 12c and node D 12d is broken. As traffic can no longer flow directly between node C 12c and node D 12d, all communication paths 82a, 82b, 82c, 82d are rerouted to bypass the broken link 80c. Immediately after the break 84 occurs, the forwarding tables for each node 12 are flushed. Because each node 12 no longer "knows" to which node 12 traffic is to be forwarded, all nodes 12 momentarily "flood" the ring with traffic by sending data to all other nodes 12 in the ring 10. Thus, assuming each communication path 82 originally occupied a bandwidth of x, during this flooding time, each communication path 82 has to support a bandwidth of 4x, i.e., all the traffic from each node 12. In this example, flushing the forwarding tables results in a 300% increase in bandwidth demand. Generally, in the worst case scenario where traffic is evenly distributed across a ring having N nodes, the increase in bandwidth demand is (N−1)*100%.

When the forwarding tables 37 have been reconstructed to account for the break 84, as shown in FIG. 23, the original communication paths 82a, 82b, 82d are reestablished, with only path 82c between node C 12c and node D 12d being rerouted around the ring 10.

Figure 24:
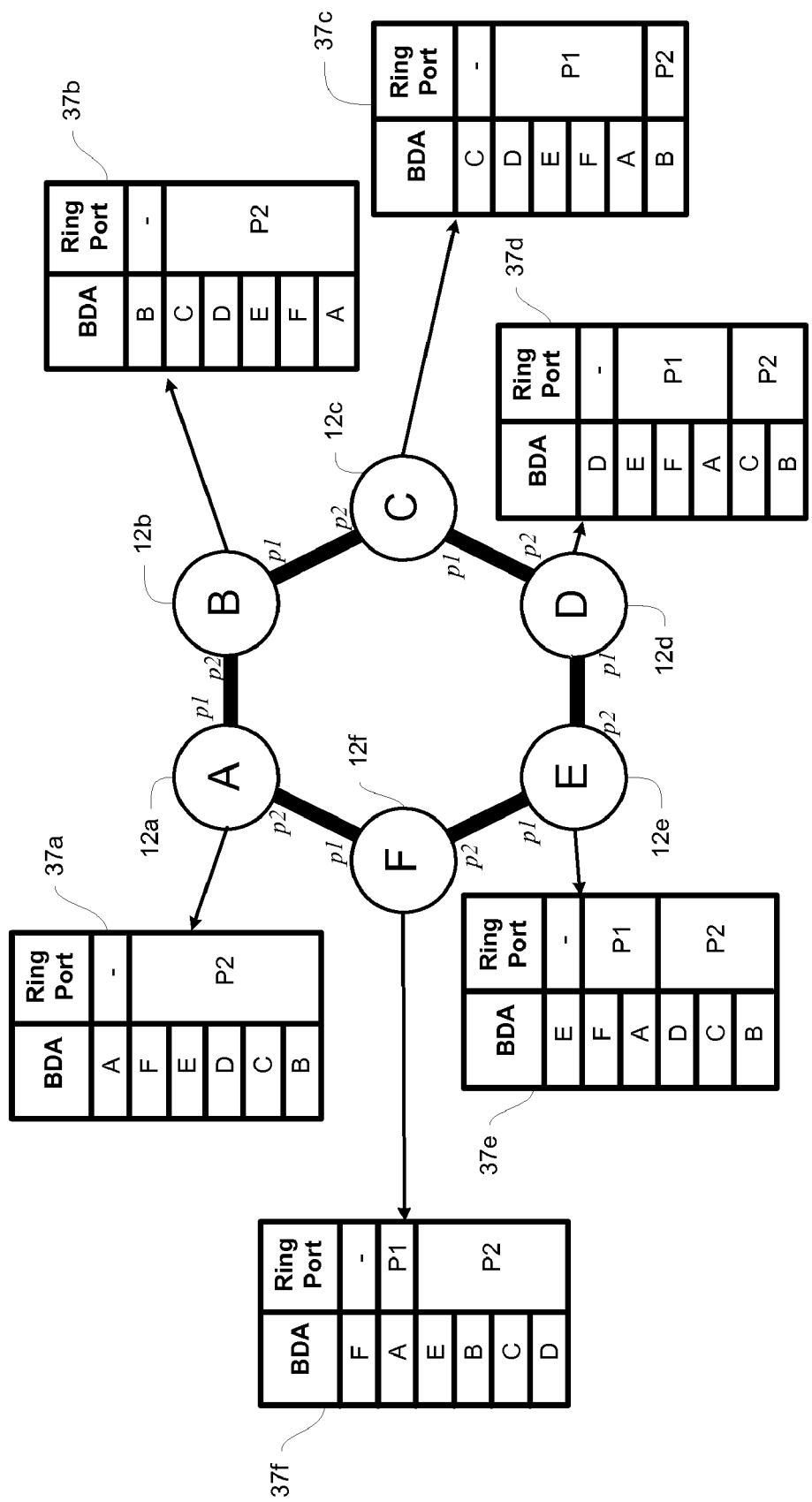
FIG. 24 is a block diagram of an exemplary E-SPRing ring showing forwarding tables constructed in accordance with the principles of the present invention.

Referring now to FIG. 24, a block diagram of an E-SPRing ring 10 is provided which shows the forwarding database tables 37 for each node 12 in the ring 10. The forwarding database tables 37 contain a broadband destination address ("BDA") of each node 12 in the ring 10, as well as which port to use when sending data to the corresponding destination node. These static entries in the forwarding database tables 37 are populated by an E-SPRing control entity after executing some type of ring discovery process, such as one of the embodiments of an automatic ring topology discovery process described above.

Figure 25:
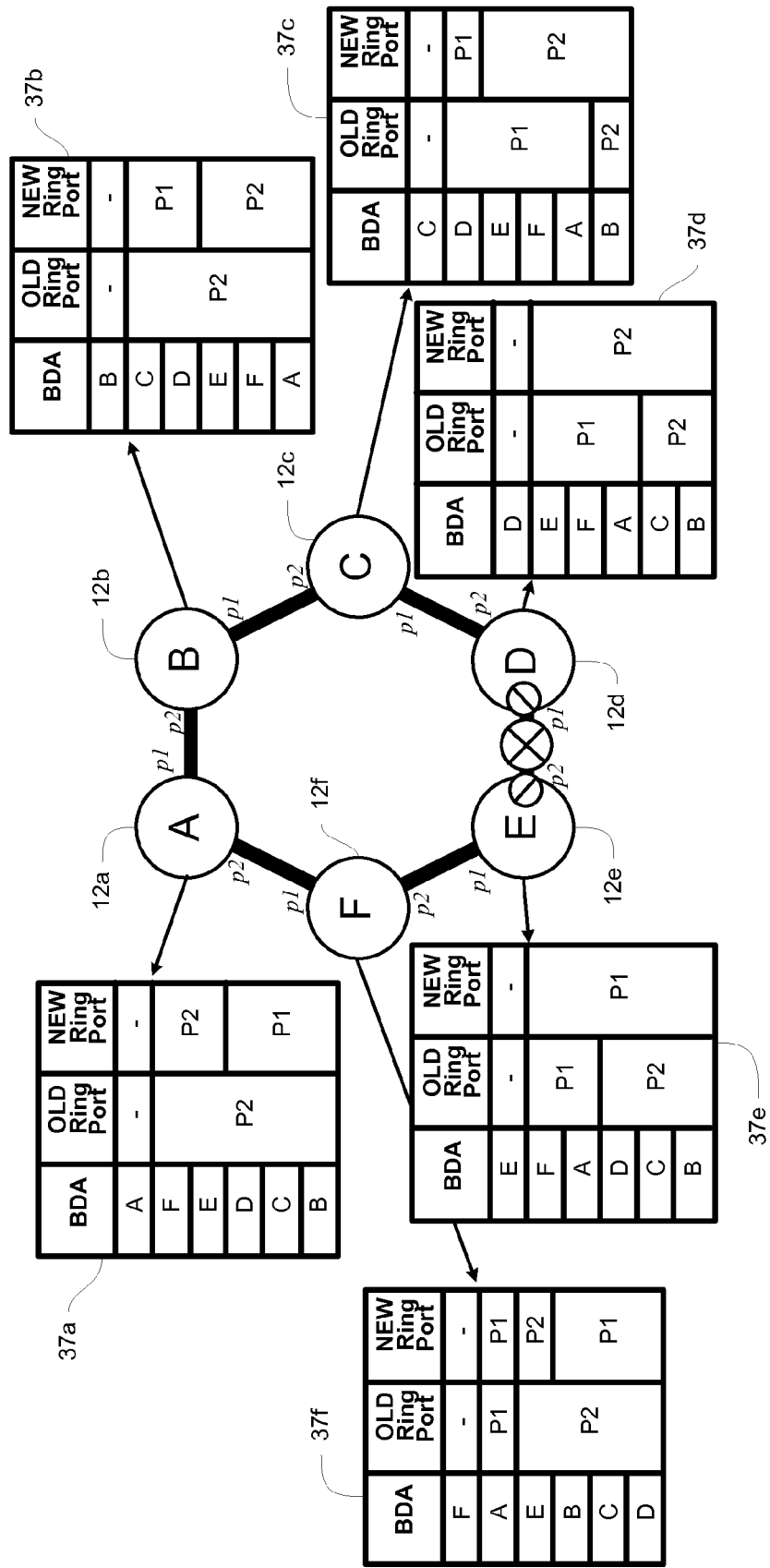
FIG. 25 is a block diagram of an exemplary E-SPRing forward database flushing nullification mechanism constructed in accordance with the principles of the present invention.

When a failure occurs, as shown in FIG. 25, in accordance with the principles of the present invention, instead of flushing the forwarding database tables 37 entries for each node, all ring nodes 12 are notified of the failure via an R-APS Failure Indication Message ("FIM"). Each FIM contains the address of the source node adjacent to the failure. All the E-SPRing nodes 12 recompute the target ring node BDA-to-port associations based on the known topology and source node, and begin forwarding data according to the new configuration. As a result of this reconfiguration, no flooding occurs over the ring due to protection and recovery switching. Thus, the overall bandwidth utilization of the ring is significantly improved.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for automatically discovering a topology of a communication network ring, the ring including a plurality of nodes, each node including a first port and a second port, the ring implementing Ring Automated Protection Switching (R-APS) messages for protection switching, the method comprising:
    receiving at least one of a ring topology request and a response to the ring topology request from at least one node on the ring, the at least one of the ring topology request and the response to the ring topology request including an identification of the at least one node and an indication of a hop count needed to reach the at least one node, the ring topology request and the response to the ring topology request being of the form of the Ring Automated Protection Switching (R-APS) messages;
    forwarding the at least one of the ring topology request and the response to the ring topology request to at least one neighboring node on the ring through the first port; and
    determining the topology based on the identification of the at least one node, the hop count, and an identification of the first port through which the at least one of the ring topology request and the response to the ring topology request is forwarded.

2. The method of claim 1, wherein the ring topology request is a Ring Automated Protection Switching message further including a type-length-value element, the method further comprising:
    receiving a ring topology request at the first port and the second port;
    modifying each ring topology request by adding an identification of a receiving node to the type-length-value element and incrementing the node count; and
    forwarding each modified ring topology request to the neighboring node through the other of the first port and the second port than the port on which the ring topology request was received.

3. The method of claim 1, wherein the at least one ring topology request is a Ring Automated Protection Switching message, the method further comprises:
    creating the at least one ring topology request by adding a type-length-value element to the Ring Automated Protection Switching message, the type-length-value element including a node signature for an originating node and the hop count; and
    initializing the hop count.

4. The method of claim 3, wherein the ring topology request is forwarded through the first port and the second port, and further wherein receiving at least one response to the ring topology request comprises:
    receiving a response at first port and the second port, each response having been forwarded through the ring from the other of the first port and the second port from which the response was received, each response including a total node count of all the nodes in the ring and an identification of each node in the ring arranged in an order of processing.

5. The method of claim 1, further comprising creating the ring topology request in response to detecting a failure of a link connected to the other of the first port and the second port from which the response was received the transmitting port.

6. The method of claim 1, wherein the ring topology request is a continuity check message, the continuity check message including a listing of identifications of nodes having previously received continuity check message, the method further comprising:
    receiving the ring topology request at one of the first port and the second port;
    modifying the ring topology request by appending an identification of a receiving node to listing of identifications of nodes having previously received continuity check message and incrementing the node count; and
    forwarding the modified ring topology request to the neighboring node through the other of the first port and the second port than the port on which the ring topology request was received.

7. The method of claim 1, wherein the ring topology request is a continuity check message, the method further comprising:
    receiving a modified ring topology request through the other of the first port and the second port than the port on which the ring topology request was transmitted, the modified ring topology request including a listing of identifications of nodes having previously received continuity check message in an order of processing and a total node count of all the node on the ring.

8. The method of claim 1, further comprising:
    populating static entries in a forwarding database table according to the topology;
    receiving notice of a failed link, the notice including a source address of a node adjacent to the failed link;
    using the topology and the source address of the node adjacent to the failed link to reconfigure the forwarding database table; and
    forwarding data using the reconfigured forwarding database table without flooding the ring.

9. The method of claim 1, wherein the indication of the hop count is based on one-half of a difference between a time to live of a link trace message and a time to live of a link trace reply.

10. The method of claim 2, wherein the type-length-value element includes at least one of a text label, a nodal state, a port state, a ring protection link (RPL) owner, a fault condition and configuration information.

11. A node for automatically discovering a topology of a communication network ring, the ring including a plurality of nodes, the ring implementing Ring Automated Protection Switching (R-APS) messages for protection switching, the node comprising:
 a first port and a second port, each port operable to receive and transmit data:
  at least one of the first port and the second port receiving at least one of a ring topology request and a response to the ring topology request from at least one other node on the ring, the at least one of the ring topology request and the response to the ring topology request including an identification of the at least one other node and an indication of a hop count needed to reach the at least one other node, the ring topology request and the response to the ring topology request being of the form of the Ring Automated Protection Switching (R-APS) messages;
  the other of the first port and the second port than the port on which the at least one of a ring topology request and a response to the ring topology request was received forwarding the at least one of a ring topology request and a response to the ring topology request to at least one neighboring node on the ring; and
 a processor electrically connected to each port, the processor determining the topology based on the identification of the at least one node, the hop count, and an identification of the forwarding port.

12. The node of claim 11, wherein the ring topology request is a Ring Automated Protection Switching message including a type-length-value element, and wherein:
 each port further receives a ring topology request; and
 the processor further:
  modifies each ring topology request by adding an identification of a receiving node to the type-length-value element and incrementing the node count; and
  forwards the modified ring topology request to the neighboring node through the other of the first port and the second port than the port on which the ring topology request was received.

13. The node of claim 11, wherein the processor further creates the at least one ring topology request by:
 adding a type-length-value element to the Ring Automated Protection Switching message, the type-length-value element including a node signature for the node and the hop count; and
 initializing the hop count.

14. The node of claim 13, wherein the ring topology request is forwarded through both ports, receiving at least one response to the ring topology request comprises:
 receiving a response at each of the first port and the second port, each response having been forwarded through the ring from the opposite port, each response including a total node count of all the nodes in the ring and an identification of each node in the ring arranged in an order of processing.

15. The node of claim 11, wherein the ring topology request is a continuity check message, at least one port further receives a modified ring topology request through the other of the first port and the second port than the port on which the ring topology request was transmitted, the modified ring topology request including a listing of identifications of nodes having previously received continuity check message in an order of processing and a total node count of all the nodes on the ring.

16. The node of claim 11, wherein the processor further:
 populates static entries in a forwarding database table according to the topology; and
 responsive to receiving notice of a failed link, the notice including a source address of a node adjacent to the failed link, the processor further:
  uses the topology and the source address of the node adjacent to the failed link to reconfigure the forwarding database table; and
  forwards data using the reconfigured forwarding database table without flooding the ring.

17. The node of claim 11, wherein the indication of the hop count is based on one-half of a difference between a time to live of a link trace message and a time to live of a link trace reply.

18. The node of claim 13, wherein the type-length-value element includes at least one of a text label, a nodal state, a port state, a ring protection link (RPL) owner, a fault condition and configuration information.

19. A system for automatically discovering a topology of a communication network ring, the ring implementing Ring Automated Protection Switching (R-APS), the system comprising:
 a plurality of nodes interconnected in a ring configuration, each node including:
  a first port and a second port, each port operable to receive and transmit data:
   at least one of the first port and the second port receiving at least one of a ring topology request and a response to the ring topology request from at least one other node on the ring, the at least one of the ring topology request and the response to the ring topology request including an identification of the at least one other node and an indication of a hop count needed to reach the at least one other node, the ring topology request and the response to the ring topology request being of the form of the Ring Automated Protection Switching (R-APS) messages;
   the other of the first port and the second port than the port on which the ring topology request was received forwarding the at least one of a ring topology request and a response to the ring topology request to at least one neighboring node on the ring; and
  a processor electrically connected to each port, the processor determining the topology based on the identification of the at least one node, the hop count, and an identification of the forwarding port.

20. The system of claim 19, wherein the indication of the hop count is based on one-half of a difference between a time to live of a link trace message and a time to live of a link trace reply.

* * * * *